United States Patent

Hasuda

[11] Patent Number: 6,072,958
[45] Date of Patent: *Jun. 6, 2000

[54] CAMERA HAVING A SHUTTER INSTRUMENTATION DEVICE WHICH DETECTS THE TRAVEL OF THE SHUTTER

[75] Inventor: Masanori Hasuda, Yokohama, Japan

[73] Assignee: Nikon Corporation, Tokyo, Japan

[*] Notice: This patent is subject to a terminal disclaimer.

[21] Appl. No.: 08/997,736

[22] Filed: Dec. 24, 1997

Related U.S. Application Data

[63] Continuation of application No. 08/204,684, Mar. 2, 1994, abandoned.

[51] Int. Cl.[7] .................................................. G03B 17/24
[52] U.S. Cl. .......................... 396/235; 396/269; 396/484
[58] Field of Search .................................. 396/268, 273, 396/439, 452, 483, 484, 235, 269, 479, 480; 73/1.56

[56] References Cited

U.S. PATENT DOCUMENTS

| | | | |
|---|---|---|---|
| 3,913,376 | 10/1975 | Scott | 73/1.56 |
| 4,572,645 | 2/1986 | Yoshida et al. | 396/235 |
| 4,907,027 | 3/1990 | Kobe et al. | 396/235 |
| 5,457,514 | 10/1995 | Hasuda et al. | 396/273 |

*Primary Examiner*—David M. Gray

[57] ABSTRACT

A camera having a shutter instrumentation device for accurately measuring the actual shutter time. The camera includes a shutter which travels in a travel plane to open and close an aperture. A signal projection unit, positioned to one side of the travel plane, projects a signal towards the travel plane of the shutter so that the signal reflects off the shutter when the aperture is closed by the shutter and so that the signal passes through the aperture when the aperture is opened by the shutter. A reflecting member, positioned on the opposite side of the travel plane as the signal projection unit is positioned, reflects signals projected by the signal projection unit which pass through the aperture. A signal receiving unit, positioned on the same side of the travel plane as the signal projection unit is positioned, receives either or both of signals projected by the signal projection unit which are reflected off the shutter and signals projected by the signal projection unit which are reflected off the reflecting member. The shutter state can be determined by monitoring the output of the signal receiving unit. The signal receiving unit output experiences two reversals during one exposure action.

27 Claims, 18 Drawing Sheets

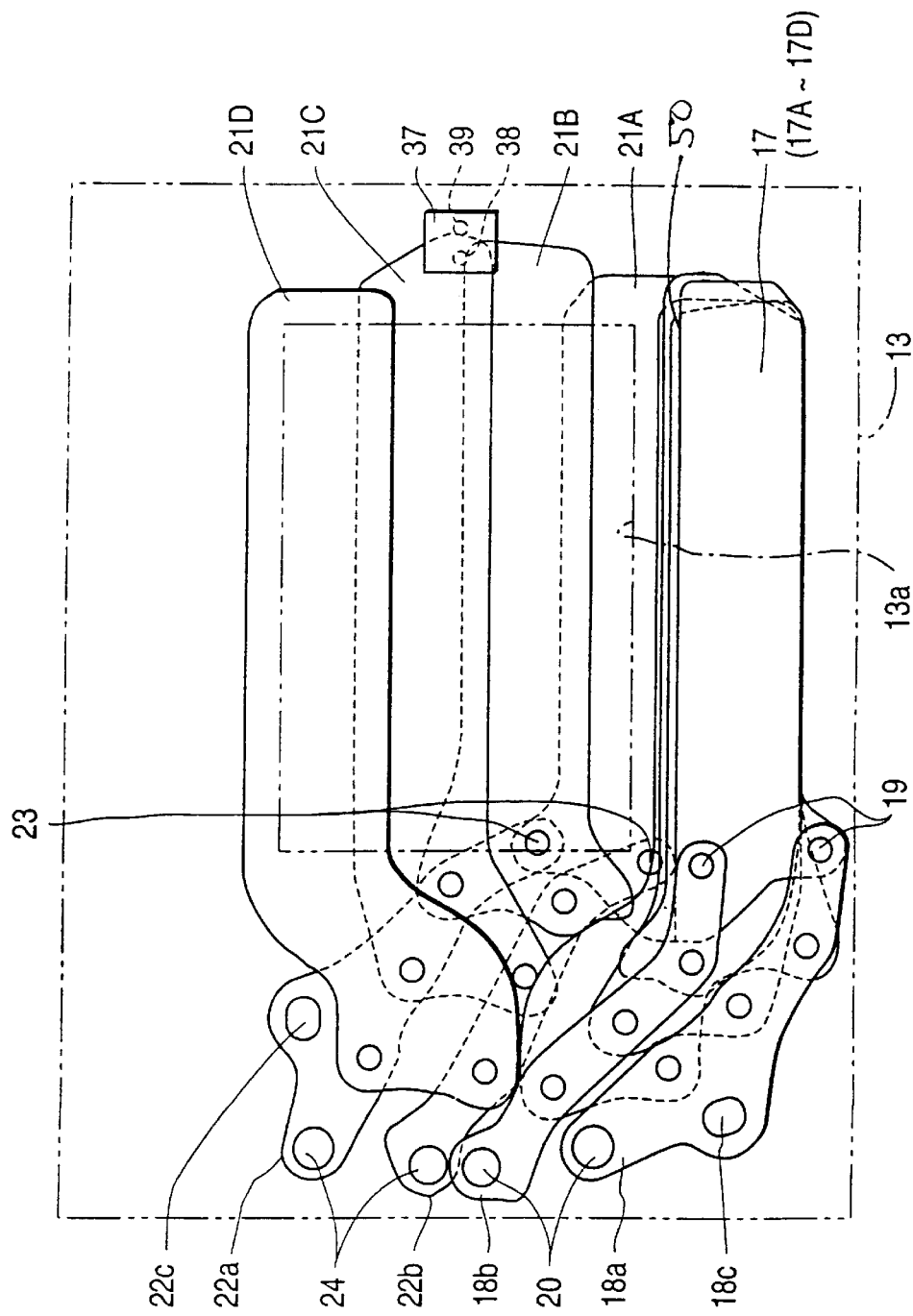

CAMERA HAVING A SHUTTER INSTRUMENTATION DEVICE WHICH DETECTS THE TRAVEL OF THE SHUTTER

CONTINUITY DATA

This application is a continuation of application Ser. No. 08/204,684, filed Mar. 2, 1994, now abandoned.

BACKGROUND OF THE INVENTION

1. Field of the Invention

The present invention relates to a camera and, more particularly, to a camera having a shutter instrumentation device.

2. Description of the Related Art

In conventional cameras, light beams from a photographic subject passing through a camera aperture are limited by a stop and the time for exposure of film is limited by a mechanical shutter. A focal plane shutter used in a single lens reflex ("SLR") camera basically comprises two blinds, a front blind and a rear blind. To control film exposure to the light beams from the photographic subject, the front and rear blinds cover the film picture plane so that the film is not exposed.

The front blind initially blocks the aperture, thereby preventing light from reaching the film picture plane. When a photographer presses a release button, the front blind is moved away from the aperture, and exposure of the film picture plane is commenced. After a predetermined time has elapsed, the rear blind moves in a position so that it blocks the aperture and covers the film picture plane. The travel of the front blind and the rear blind is performed mechanically, energized by spring force, and the commencement of travel is performed by releasing a mechanical hold.

Typically, the front and rear blind operations are controlled purely mechanically. However, electrical control has become widely used in recent years. With electrical control, spring force is used to drive the travel of the front blind and the rear blind, but the engagement and disengagement of a mechanical hold of the front and rear blinds are controlled by passing current to an electromagnet.

Moreover, there is a need to increase the speed of a focal plane shutter. For example, shutter speeds of $1/8,000$ second are desirable. In addition, there is a widespread tendency to use strobe, thereby requiring an increase in the synchronized speed of focal plane shutters to allow photography in bright surroundings.

In order to increase the synchronous speed of focal plane shutters, the spring force controlling the front and rear blinds is increased and the front and rear blinds are moved in rapid succession. In addition, by rapidly moving the front and rear blinds, a slit of narrow width is formed. The width of the slit can be controlled by the overlapping motion of the front and rear blinds.

The present invention recognizes that, even with accurate timing of current flow in the electromagnet, the film exposure time cannot be accurately controlled. The actual exposure time depends only on the mechanical travel of the front blind and the rear blind. As displacement elements, there is scatter in the speed of separation of the hold mechanism and the mechanical travel system (which includes a spring). Moreover, these mechanical elements inevitably have varying characteristics due to temperature characteristics or changes with time. These problems become more prevalent when blind travel speeds are increased.

When in an anomalous state, the desired shutter speed is not obtained and the amount of exposure of the film surface becomes insufficient. In extreme cases, the front blind and the rear blind overlap as they travel, with the result that the film is not exposed at all. A converse phenomenon can occur if the blinds do not close, thereby resulting in overexposure.

These problems are especially prevalent in a camera with a shutter having a fast blind speed and narrow slit width.

Also, if any of the above problems occur during photography, the problems cannot be detected until the film is developed. This poses a serious problem since a photographer could continue to take photographs without realizing that the film is not being properly exposed.

SUMMARY OF THE INVENTION

Accordingly, it is an object of the present invention to provide a camera with a shutter instrumentation device which accurately measures the travel state of the shutter.

It is an additional object of the present invention to provide a camera with a shutter instrumentation device which uses a signal projection unit and a signal receiving unit to project a signal towards a shutter and receive a reflected signal, respectively, wherein the travel state of the shutter and the actual exposure time is determined from the output of the signal receiving unit.

It is a further object of the present invention to provide a camera with a shutter instrumentation device which is designed so that the output of a signal receiving unit only experiences two reversals during one exposure, thereby allowing easier processing of the signal receiving unit output.

Additional objects and advantages of the invention will be set forth in part in the description which follows and, in part, will be obvious from the description, or may be learned by practice of the invention.

The foregoing objects of the present invention are achieved by providing a camera which comprises a shutter which travels in a travel plane to open and close an aperture; a signal projection unit, positioned to one side of the travel plane, for projecting a signal towards the travel plane of the shutter so that the signal reflects off the shutter when the aperture is closed by the shutter and so that the signal passes through the aperture when the aperture is opened by the shutter; a reflection member, positioned on the opposite side of the travel plane as the signal projection unit is positioned, for reflecting signals projected by the signal projection unit which pass through the aperture; and a signal receiving unit, positioned on the same side of the travel plane as the signal projection unit is positioned, for receiving signals projected by the signal projection unit which are reflected off the shutter and for receiving signals projected by the signal projection unit which are reflected off the reflection member. When the shutter closes the aperture, the shutter covers at least one of the signal projection unit, the signal receiving unit and the reflecting member. In addition, the reflecting member can be selected to have a specular reflective surface.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 13 is a plan view of a shutter instrumentation device of a camera according to an embodiment of the present invention.

DESCRIPTION OF THE PREFERRED EMBODIMENTS

Figure 1:
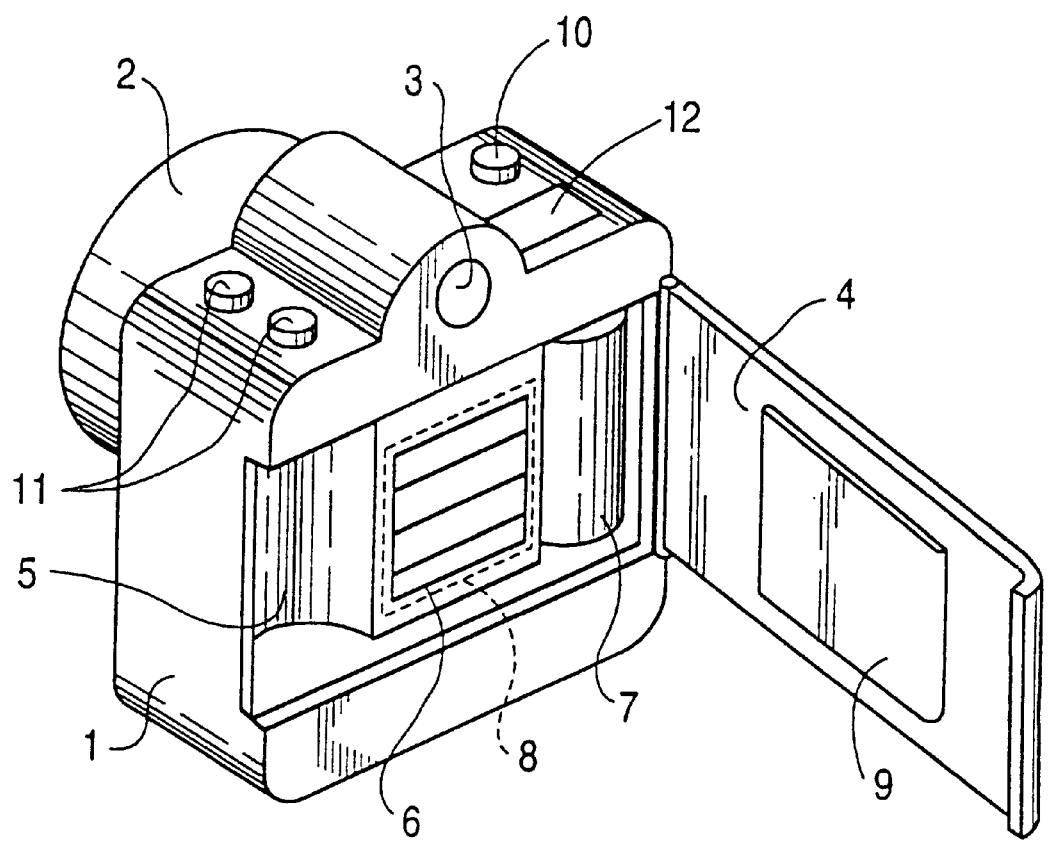
FIG. 1 is an oblique view showing a camera having a shutter instrumentation device of a camera according to an embodiment of the present invention.

Reference will now be made in detail to the present preferred embodiments of the present invention, examples of which are illustrated in the accompanying drawings, wherein like reference numerals refer to like elements throughout.

FIG. 1 is an oblique view of a camera having a shutter instrumentation device according to an embodiment of the present invention. Camera 1 has a back cover 4 which is shown in an opened state. A film cartridge (not illustrated) is loaded into cartridge compartment 5. Film (not illustrated) withdrawn from the cartridge passes across the front face of aperture 6 to be wound up on spool 7. Pressure plate 9, arranged on the inside of back cover 4, operates to press the film and keep it flat against aperture 6. A film detection switch (not illustrated) detects whether or not film has been loaded into camera 1. Shutter 8, indicated by a broken line in FIG. 1, is located on the inside of aperture 6 and covers a slightly wider region than aperture 6. Shutter 8 passes light from a subject (not illustrated) via lens 2 to the film picture plane for a predetermined time.

A photographer observes the circumstances of the subject through lens 2 from viewfinder 3. Exposure is commenced by pressing release button 10.

Exposure mode and various conditions can be confirmed from display device 12. Liquid crystal display (LCD) 34 (see FIG. 2) is built into display device 12.

Plural setting buttons 11 are operating buttons which change the operating mode and photographic conditions of camera 1. The photographer can perform operations while confirming characters and symbols on display device 12.

Figure 2:
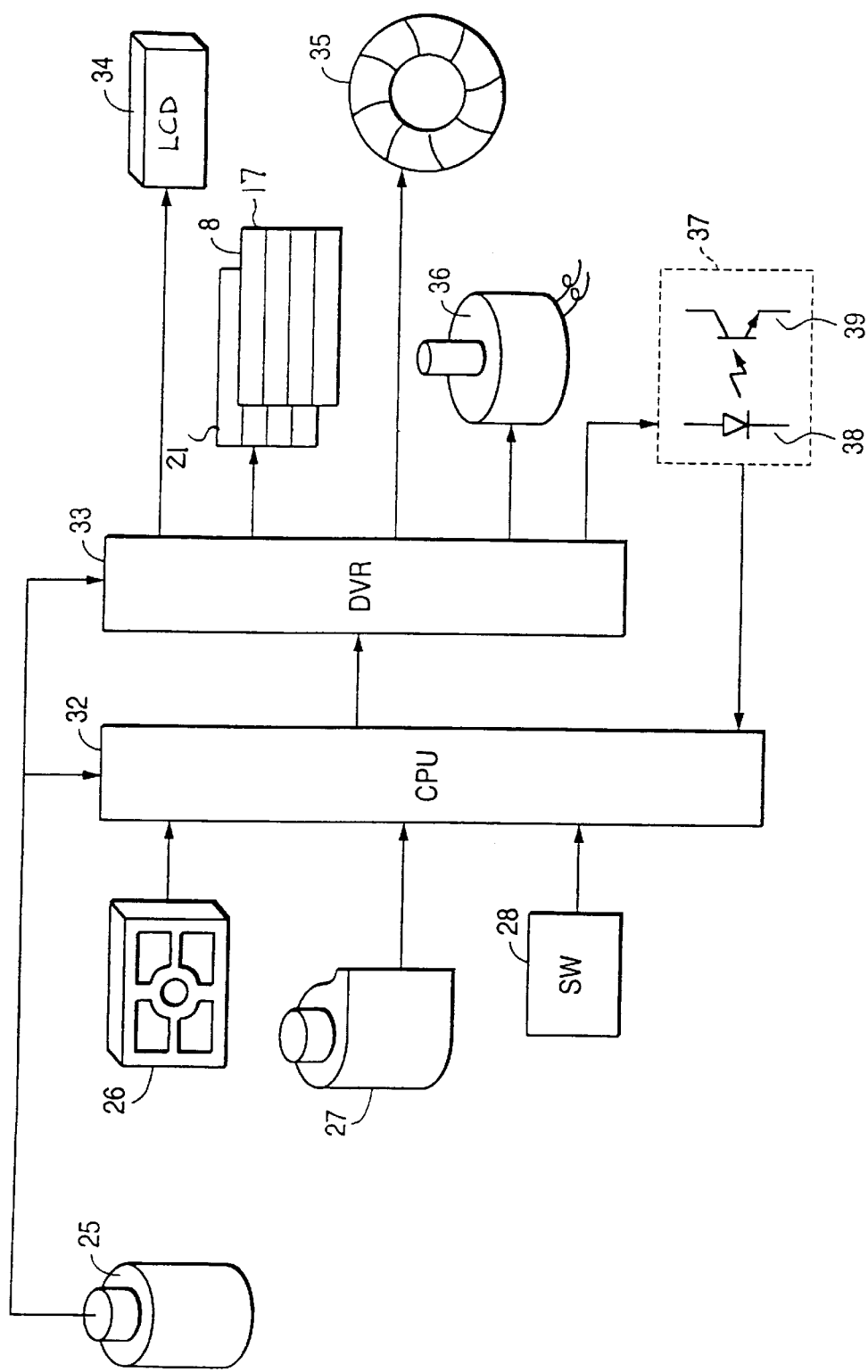
FIG. 2 is a block diagram showing an overall configuration of a camera having a shutter instrumentation device according to an embodiment of the present invention.

FIG. 2 is a block diagram of an overall configuration of camera 1 according to an embodiment of the present invention. Battery 25 supplies electric power. CPU 32 effects central control. The following devices are input to CPU 32.

Photometric device 26 measures the luminosity of a subject and divides the luminosity into multiple portions corresponding to multiple portions of the subject and supplies multiple measurement values to CPU 32. Film sensitivity detection mechanism 27 reads code signals provided on the side surface of a loaded film cartridge and inputs film sensitivity information to CPU 32. Switch detection mechanism (SW) 28 includes manual operation switches (not illustrated) connected to release button 10, setting buttons 11 and the film detection switch, and also includes timing switches (not illustrated) for the detection of the sequence of camera operations. Camera state information is supplied from switch detection mechanism 28 to CPU 32. CPU 32 performs drive control through driver mechanism (DVR) 33. LCD 34 displays information relating to the exposure mode, operating mode, warning information, etc.

Shutter 8 comprises front blind 17 and rear blind 21. Front blind 17 includes shutter vanes 17A–17D (see FIG. 9). Rear blind 21 includes shutter vanes 21A–21D (see FIG. 13). Front blind magnet (not illustrated) holds front blind 17 to prevent front blind 17 from traveling. Rear blind magnet (not illustrated) holds rear blind 21 to prevent rear blind 21 from traveling. The operating time interval of the front blind magnet and rear blind magnet controls the exposure time of film through aperture 6 by controlling the travel of front blind 17 and rear blind 21.

Driver mechanism 33 drives stop 35 in lens 2 to control the amount of light passing through aperture 6.

CPU 32, by driving motor 36, effects the urging action of shutter drive springs (not illustrated) to drive front blind 17 and rear blind 21. CPU 32 also drives motor 36 to control film forwarding, winding, rewinding, movement of a reflecting mirror (not illustrated) in the photographic light path and movement of stop 35.

Furthermore, CPU 32 controls detection device 37. Detection device 37 operates emitting light from LED 38 and reflected signals through light receiving element 39 (which is preferably a phototransistor).

Figure 3:
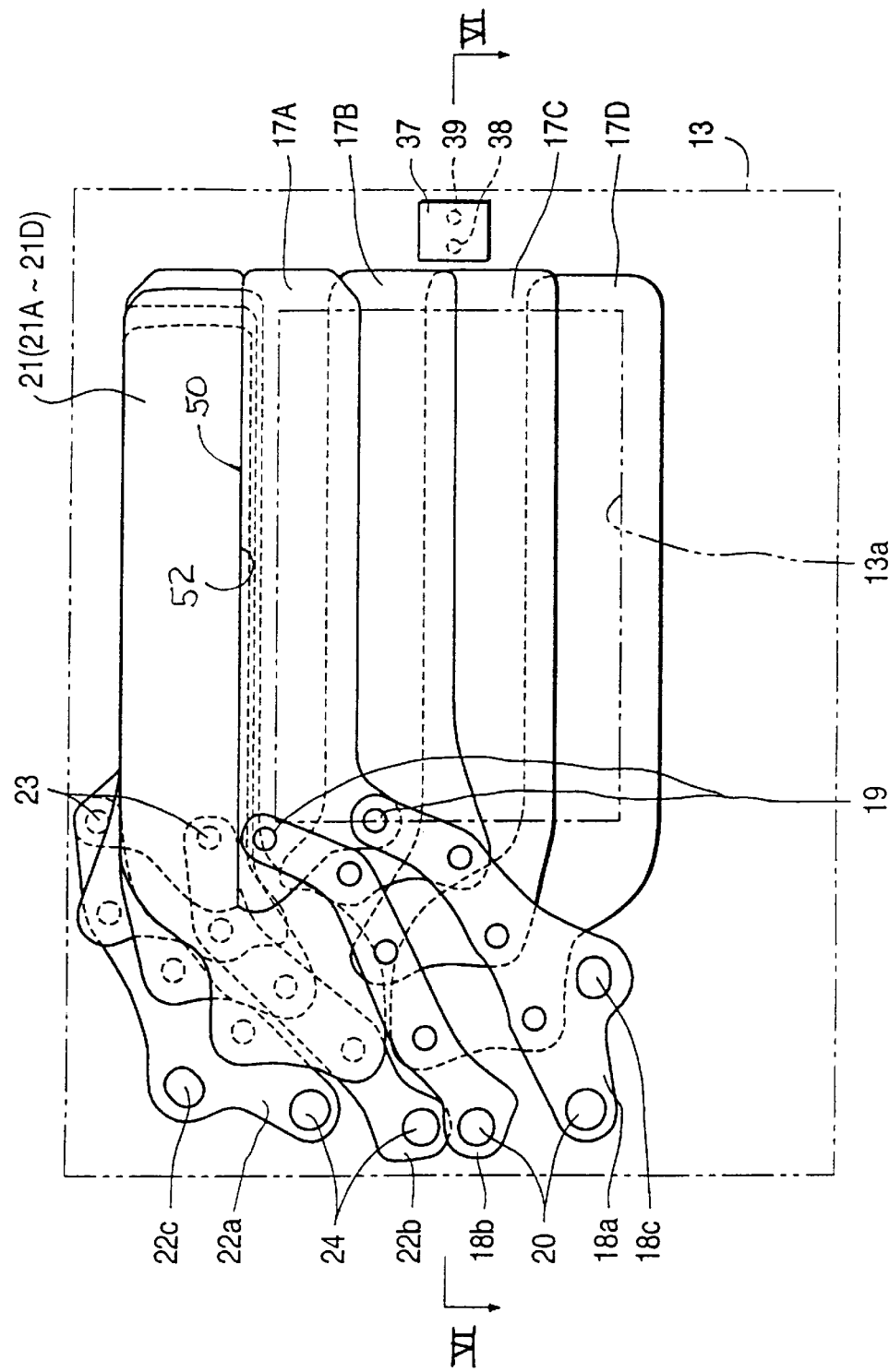
FIG. 3 is a plan view of a shutter instrumentation device of a camera according to an embodiment of the present invention.

FIG. 3 is a plan view of a shutter instrumentation device of a camera of an embodiment of the present invention. FIG. 3 illustrates a relationship between shutter vanes 21A–21D, 17A–17D and detection device 37 during an initial state in which front blind 17 covers aperture 13a and rear blind 21 is folded "upwards" of aperture 13a. This initial state represents the shutter state immediately before exposure begins, which occurs when a photographer initially presses release button 10.

Baseplate 13 has aperture 13a for exposing film to light from a subject. Front blind 17 comprises four shutter vanes 17A–17D. Shutter vanes 17A–17D are rotatably mounted on arms 18a and 18b by pins 19. Arms 18a and 18b are rotatably mounted on shafts 20 set into baseplate 13. Arms 18a and 18b perform parallel ring-like motions. Slit edge 50 of shutter vane 17A is maintained horizontally and moves between a position in which aperture 13a is covered and a position in which aperture 13a is not covered (or "open").

Rear blind 21 also comprises four shutter vanes 21A–21D. Shutter vanes 21A–21D are rotatably mounted on arms 22a and 22b by pins 23. Arms 22a and 22b are rotatably mounted on shafts 24 set into baseplate 13. Arms 22a and 22b perform parallel ring-like motions. Slit edge 52 of the vane 21A is maintained horizontally and moves between a position in which aperture 13a is covered and a position in which aperture 13a is not covered (or "open").

A hole 18c in arm 18a and a hole 22c in arm 22a are coupled to and driven by a drive mechanism (not illustrated). Via the movement of arms 18a, 18b, 22a and 22b, front blind 17 and rear blind 21 open and close aperture 13a.

Detection device 37 detects the state of travel of front blind 17 and rear blind 21. Detection device 37 is mounted on baseplate 13 by an adhesive. Detection device 37 is equipped with a light emitting diode (LED) 38 and a light receiving element 39.

Figure 6:
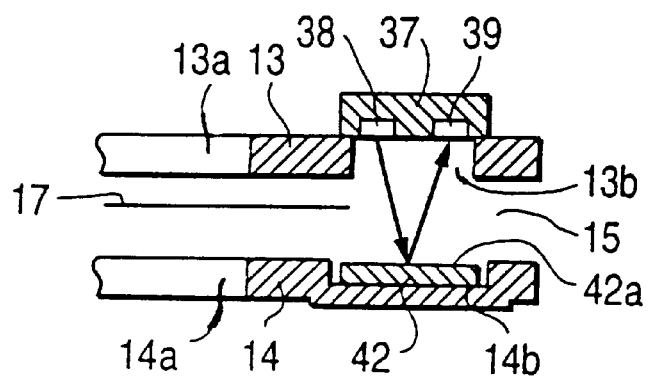
FIG. 6 is a cross-sectional view of a shutter instrumentation device of a camera according to an embodiment of the present invention.

FIG. 6 is a partial cross-sectional view of the device of FIG. 3 taken along line VI—VI in FIG. 3. LED 38 and light receiving element 39 face downwards from an open hole 13b in baseplate 13. LED 38 and light receiving element 39 are positioned to detect front blind 17 and rear blind 21. Cover plate 14 is approximately equal size to baseplate 13 and has an aperture 14a which is approximately equal size to aperture 13a in baseplate 13. Vane compartment 15 is formed by baseplate 13 and cover plate 14. Front blind 17 and rear blind 21 (not illustrated in FIG. 6) are received in vane compartment 15. Reflecting member 42 is mounted by adhesive in concave portion 14b of cover plate 14. Reflecting member 42 is located in a position facing detection device 37. Reflecting member 42 has reflective surface 42a which faces detection device 37. Light emitted from LED 38 is reflected by reflective surface 42a and shines on light receiving element 39.

Figure 5:
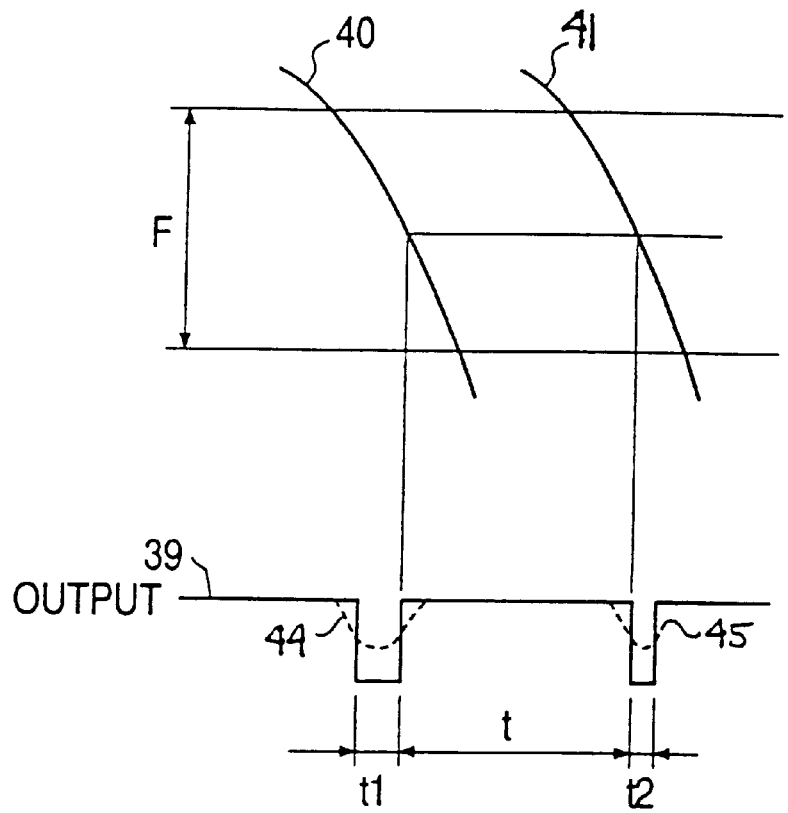
FIG. 5 is a timing chart illustrating the action of a camera having a shutter instrumentation device according to an embodiment of the present invention.

FIG. 5 illustrates the output of light receiving element 39 in relation to the travel of front blind 17 and rear blind 21, according to an embodiment of the present invention. The travel of front blind 17 is represented by travel curve 40 and the travel of rear blind 21 is represented by travel curve 41.

In the initial state shown in FIG. 3, front blind 17 covers aperture 13a, rear blind 21 is folded upwards of aperture 13a and detection device 37 is unobstructed. Therefore, light from LED 38 is reflected by reflective surface 42a and is incident on light receiving element 39. Accordingly, the output of the light receiving element 39 is at a high level.

When front blind 17 travels as shown by travel curve 40, front blind 17 moves in a circular arcuate motion, and moves to gradually cover detection device 37.

The reflectivity of front blind 17 and rear blind 21 is made a lower reflectivity than the reflectivity of reflective surface 42a. Therefore, when front blind 17 or rear blind 21 covers detection device 37, light emitted by LED 38 is projected towards shutter vanes 17A–17D or 21A–21D, respectively, and reflected to light receiving element 39. When front blind 17 and rear blind 21 are not covering detection device 37, light emitted by LED 38 is reflected off reflecting member 42 and received by light receiving element 39. In this manner, light receiving element 39 can distinguish between the state when detection device 37 is covered compared to when detection device 37 is not covered.

In a preferred embodiment of the present invention, no light reaches light receiving element 39 when front blind 17 or rear blind 21 covers detection device 37 due to the low reflectivity of front blind 17 and rear blind 21; however, it is likely that a small amount of light reaches light receiving element 39 when front blind 17 or rear blind 21 covers detection device 37. In this case, the state in which front blind 17 or rear blind 21 covers detection device 37 can be distinguished from the state in which detection device 37 is not covered by distinguishing between different light levels of light received by light receiving element 39.

Figure 4:
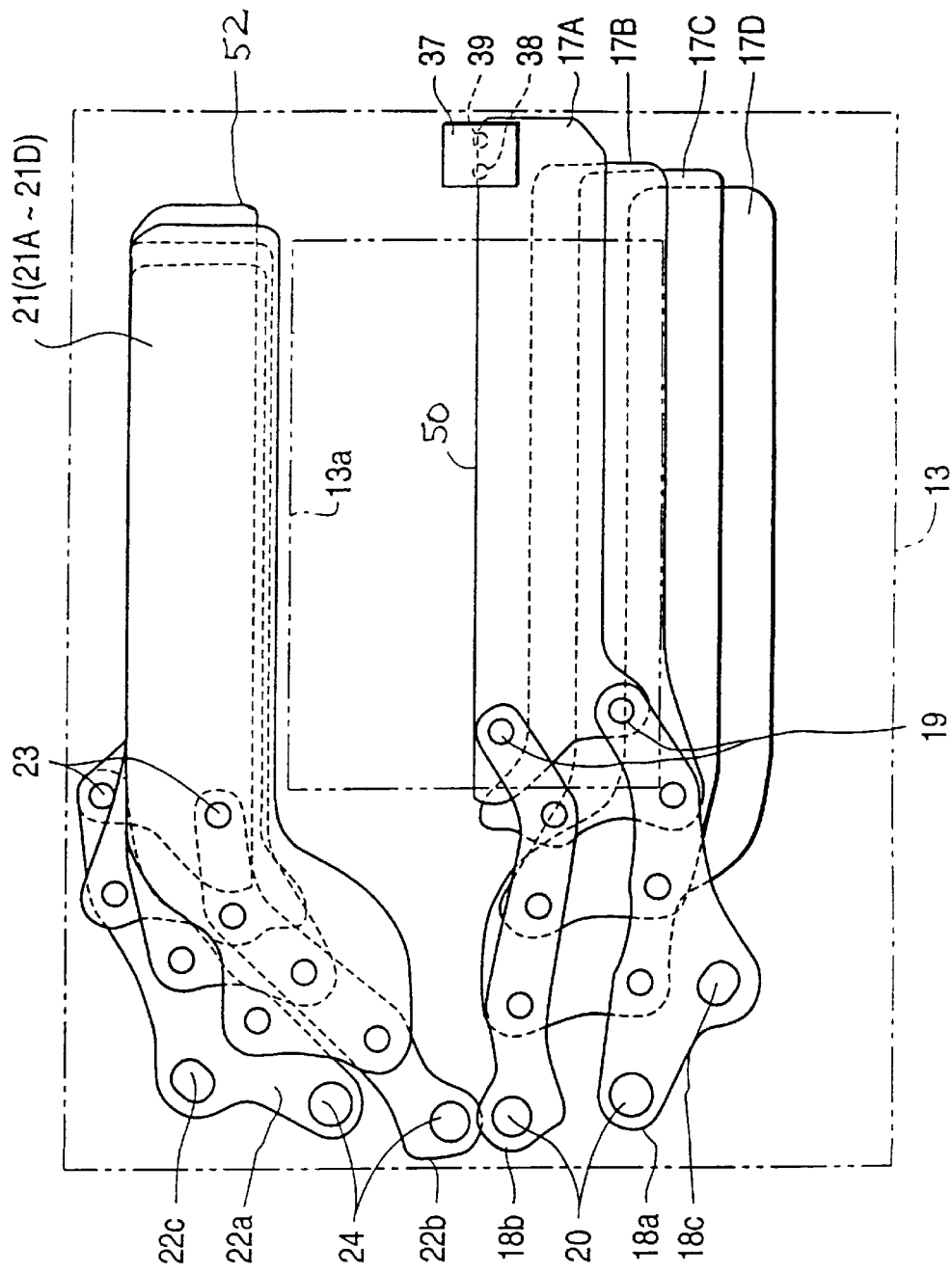
FIG. 4 is a plan view of a shutter instrumentation device of a camera according to an embodiment of the present invention.

In FIG. 5, output of light receiving element 39 is at a high level when front blind 17 or rear blind 21 are not covering detection device 37 and the output reverses to a low level when either front blind 17 or rear blind 21 covers detection device 37. During time t1, shutter blind 17A is travelling past detection device 37 and, therefore, the output of light receiving element 39 during time t1 is at a low level. As shown in FIG. 4, after time t1, slit edge 50 of shutter vane 17A travels as far as detection device 37 and the output of light receiving element 39 reverses to a high level.

After an additional time t from when slit edge 50 of shutter vane 17A travelled past detection device 37, slit edge 52 of rear blind 21A travels to the location of detection device 37 and, therefore, the output of light receiving element 39 reverses to a low level. After an additional time t2, rear blind 21 no longer obstructs detection device 37 and the output of light receiving element 39 reverses to a high level. Shortly afterwards, the travel of rear blind 21 ends.

After time t2, front blind 17 is folded downwards of aperture 13a, rear blind 21 covers aperture 13a, but the detection device 37 is in an uncovered state. Thus, the output waveform from light receiving element 39 as shown in FIG. 5 is obtained. Time t is the actual exposure time detected by the detection device 37.

The travel of front blind 17 and rear blind 21 is fast during a high speed shutter. Therefore, travel curves 40 and 41 are steeply inclined and, accordingly, times t1 and t2 become very short. As a result, in many cases the response of detection device 37 is slow and the output waveform of light receiving element 39 collapses, as shown by collapsed pulses 44 and 45. In this case, detection becomes difficult.

Moreover, even if hardware components of detection device 37 are appropriate for detecting high shutter speeds, software needed to detect and process the actual exposure time t becomes complicated since the output of light receiving element 39 reverses between high and low levels at four separate times in one exposure action (see FIG. 5).

If the length of shutter vanes 17A–17D and 21A–21D is extended so that more vanes or a larger vane portion of front blind 17 and rear blind 21 reliably cover detection device 37, the above problems are solved since t1 and t2 become longer, allowing longer processing time. However, new problems arise because the size and weight of shutter 8 increases.

Consequently, the present invention has as an additional object to provide a camera having a shutter instrumentation device in which there are only two reversals of the output waveform of detection device 37 during one exposure. In this manner, the shutter time can be reliably detected and furthermore, shutter size and weight can be minimized.

Figure 7:
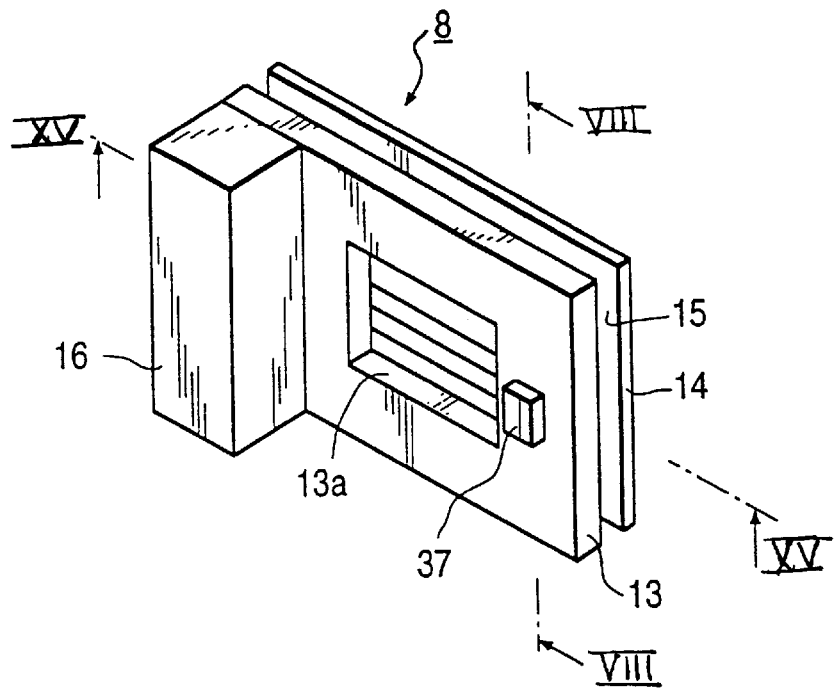
FIG. 7 is an oblique view showing a shutter instrumentation device of a camera according to an embodiment of the present invention.

FIG. 7 is an oblique view of shutter 8 of a preferred embodiment of the present invention. Baseplate 13 and cover plate 14 are positioned in parallel, spaced relationship with each other. Vane compartment 15 is formed between baseplate 13 and cover plate 14. Aperture 13a is formed in baseplate 13 for exposure of film. Aperture 13a is positioned to correspond with aperture 6 of camera 1 in FIG. 1. Aperture 14a (not illustrated in FIG. 7) is formed in cover plate 14 to correspond with aperture 6 and aperture 13a.

Shutter mechanism 16 controls shutter time. Shutter mechanism 16 includes shutter vane springs (not illustrated) for driving front blind 17 and rear blind 21, a front blind magnet (not illustrated) and a rear blind magnet (not illustrated) for holding front blind 17 and rear blind 21, respectively. Shutter mechanism 16 also includes a charge mechanism (not illustrated) for charging the shutter vane springs. Shutter mechanism 16 and detection device 37 are both mounted on baseplate 13, positioned on opposite sides of aperture 13a.

When front blind magnet is ON, front blind 17 is held in a position covering aperture 13a. When front blind magnet is set OFF, front blind 17 begins to travel. When rear blind magnet is ON, rear blind 21 is held in position, folded above aperture 13a. When rear blind magnet is set OFF, rear blind 21 begins to travel in a manner which covers aperture 13a.

When a photographer presses release button 10, current passes through the front blind magnet and the rear blind magnet, thereby setting the front blind magnet and the rear blind magnet ON. At this point in time, electrical holding of front blind 17 and rear blind 21 commences. When the release button is pressed, there is a changeover from mechanical holding of front blind 17 and rear blind 21 to electrical holding. After this changeover, by the action of well-known mechanisms (not illustrated), control of stop 35 of lens 2 and raising of a reflecting mirror (not illustrated) from the photographic light path are performed.

Figure 8:
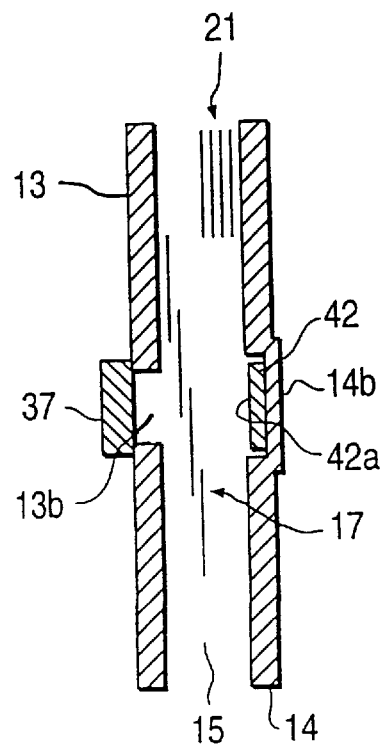
FIG. 8 is a cross-sectional view of the shutter instrumentation device illustrated in FIG. 7 for a camera according to an embodiment of the present invention.

FIG. 8 is a cross-sectional view of the shutter of FIG. 7 taken along line VIII—VIII of FIG. 7. Front blind 17 and rear blind 21 are located in vane compartment 15, and are movable between a position covering aperture 13a and a position opening aperture 13a. Reflecting member 42 is mounted with adhesive in concave portion 14b of cover plate 14. Reflective surface 42a, formed on the surface of reflecting member 42, faces detection device 37.

The reflectivity of reflective surface 42a is established as a high reflectivity. In addition, reflective surface 42a is established as a specular reflecting surface (a surface with an equal angle of incidence and angle of reflection). On the other hand, the surfaces of front blind 17 and rear blind 21 are both made with a low reflectivity. Detection device 37 is located in a position facing reflecting member 42. Detection device 37 includes LED 38 and light receiving element 39 and detects front blind 17 and rear blind 21 through opening 13b in the front surface of baseplate 13.

When neither front blind 17 nor rear blind 21 are covering detection device 37, light emitted from LED 38 reflects from reflective surface 42a of reflecting member 42. Since the reflectivity of reflective surface 42a is set to a high reflectivity, the light is reflected from reflective surface 42a and is incident on light receiving element 39 so that the output of light receiving element 39 becomes high. On the other hand, when either front blind 17 or rear blind 21 covers detection device 37, the light from LED 38 is reflected from the low reflectivity vane surfaces of shutter vanes 17A–17D or 21A–21D and is incident on light receiving element 39. The output of light receiving element 39 becomes a low level and, therefore, it is possible to detect the presence of front blind 17 and rear blind 21.

In a preferred embodiment of the present invention, the reflectivity of reflective surface 42a is 70% or more, and the reflectivity of shutter vane surfaces is desirably 25% or less.

FIGS. 9–13 are plan views to illustrate the action of front blind 17 and rear blind 21 and represent a sequential evolution of shutter states from the beginning of exposure (FIG. 9) through the end of exposure (FIG. 13).

Figure 9:
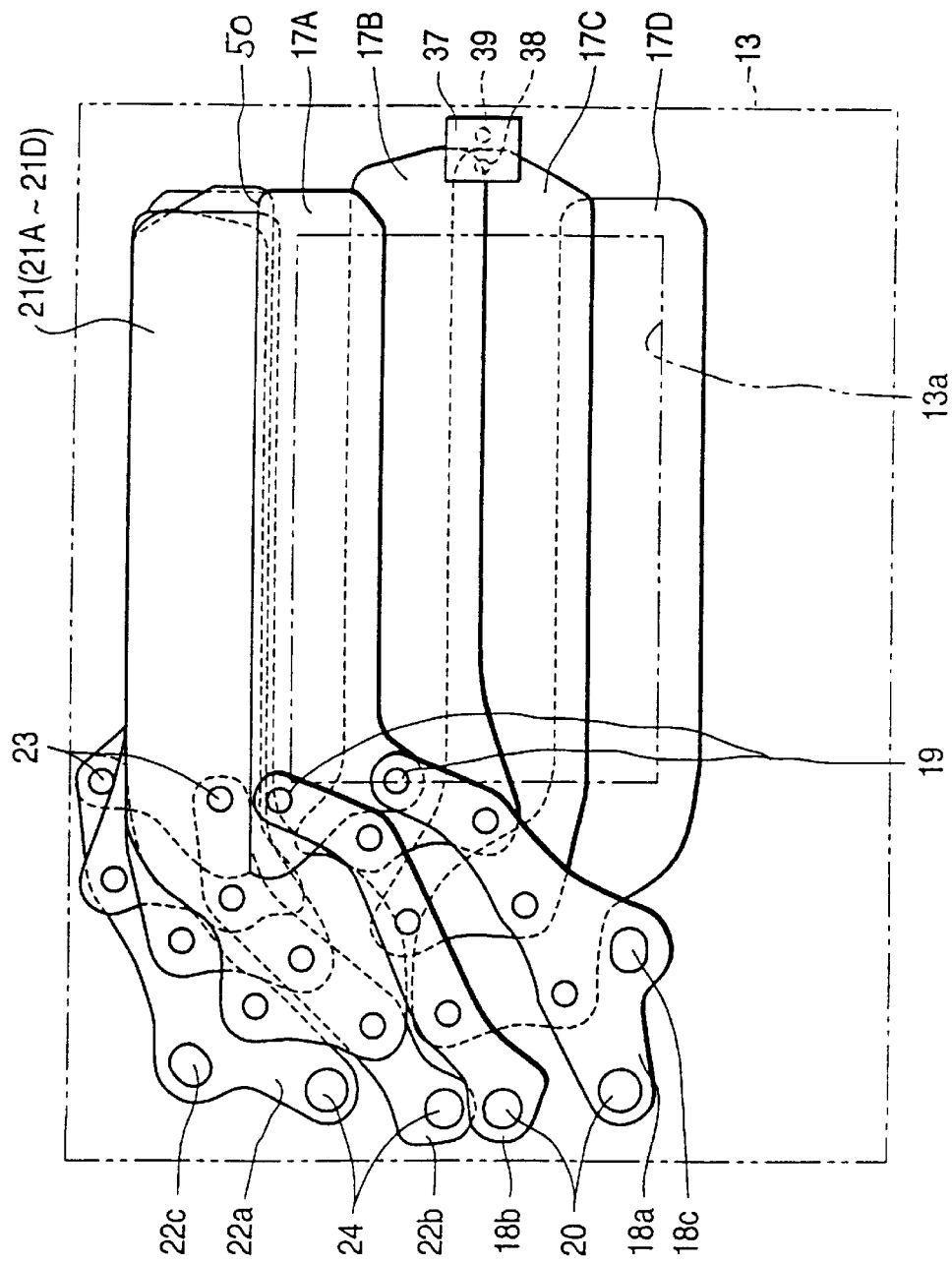
FIG. 9 is a plan view of a shutter instrumentation device of a camera according to an embodiment of the present invention.

Front blind 17, constituted by four shutter vanes 17A–17D, includes slit forming shutter vane 17A. Rear blind 21, constituted by four vanes 21A–21D, includes slit forming shutter vane 21A. In FIG. 9, the horizontal length of shutter vanes 17B and 17C of the front blind 17 extend approximately to an intermediate position between LED 38 and light receiving element 39 of detection device 37 and cover only LED 38. Moreover, in FIG. 13, the horizontal length of shutter vanes 21B and 21C of rear blind 21 are similarly constituted so as to extend approximately to an intermediate position between LED 38 and light receiving element 39 of detection device 37 and cover only LED 38.

Detection device 37 is located approximately in a vertically central position of aperture 13a relative to the direction of travel of front blind 17 and rear blind 21. LED 38 and light receiving element 39 are positioned in a perpendicular direction relative to the direction of travel of front blind 17 and rear blind 21, that is, the orientation of detection device 37 is established such that LED 38 and light receiving element 39 are aligned in a direction parallel to slit edges 50 and 52 of shutter vanes 17A and 21A, respectively.

Reflecting member 42 (not illustrated in FIGS. 9–13) is located in a position opposite detection device 37. Front blind 17 and Rear blind 21 are positioned so that they pass between detection device 37 and the reflecting member 42.

Figure 10:
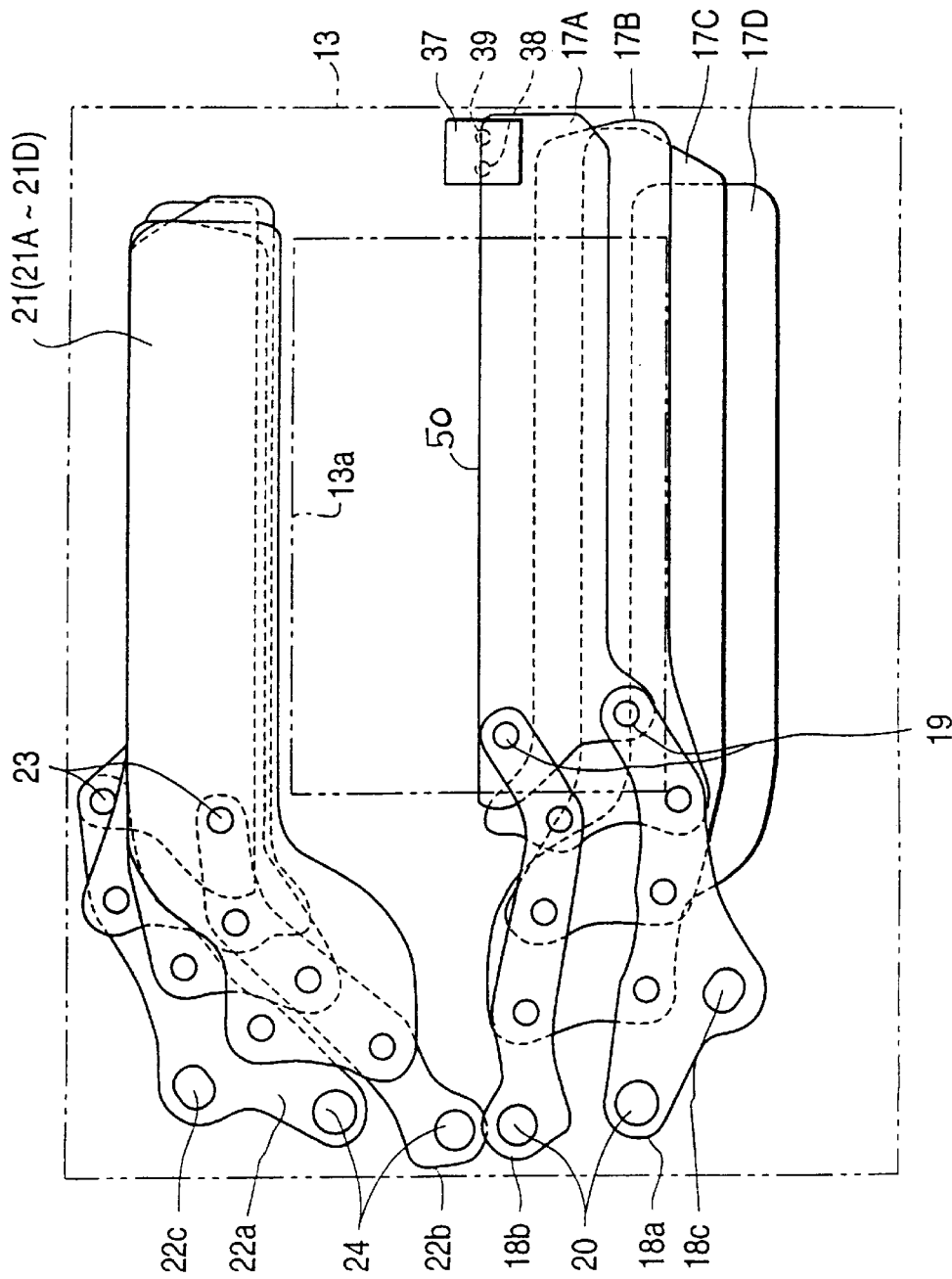
FIG. 10 is a plan view of a shutter instrumentation device of a camera according to an embodiment of the present invention.
Figure 11:
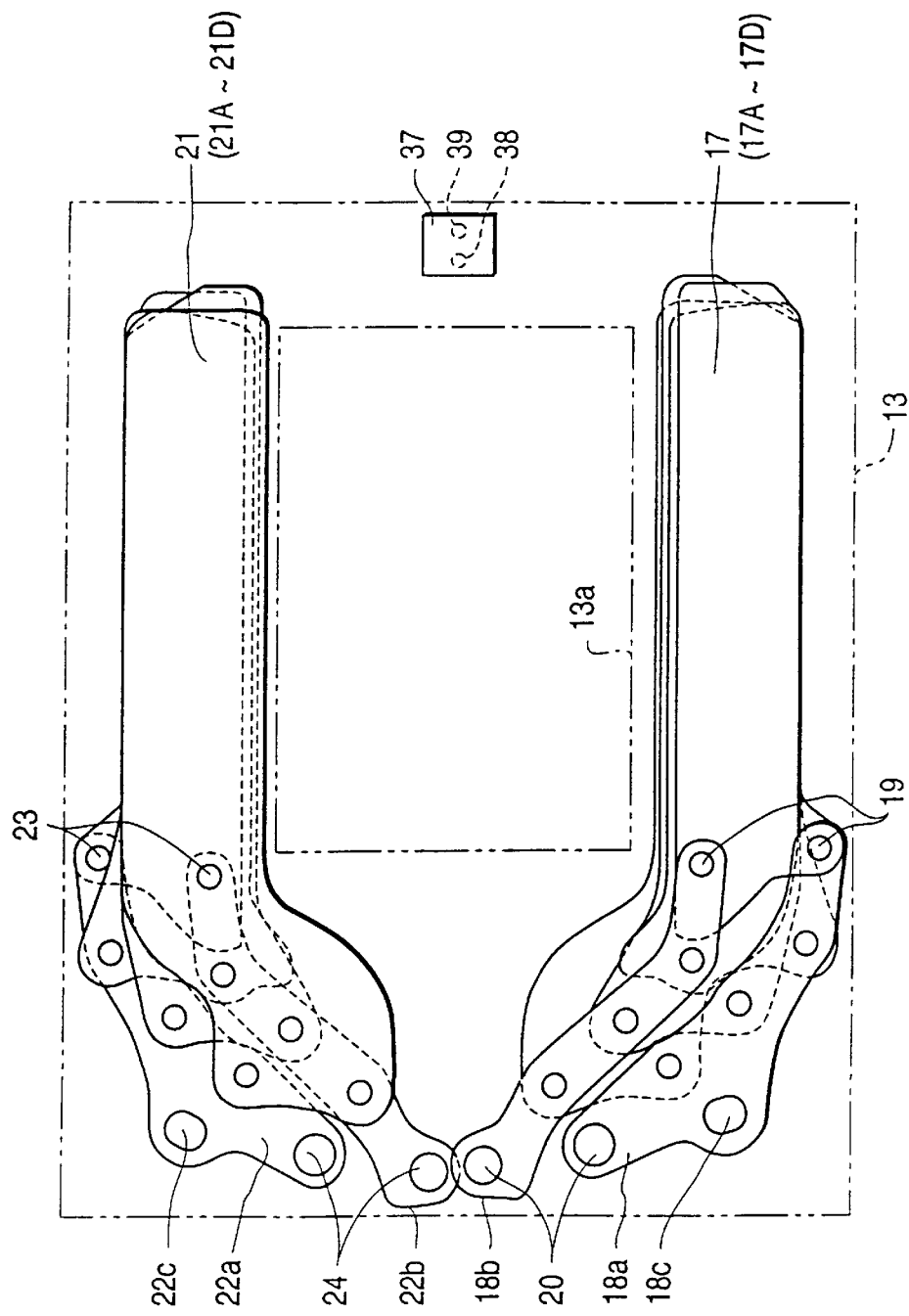
FIG. 11 is a plan view of a shutter instrumentation device of a camera according to an embodiment of the present invention.
Figure 12:
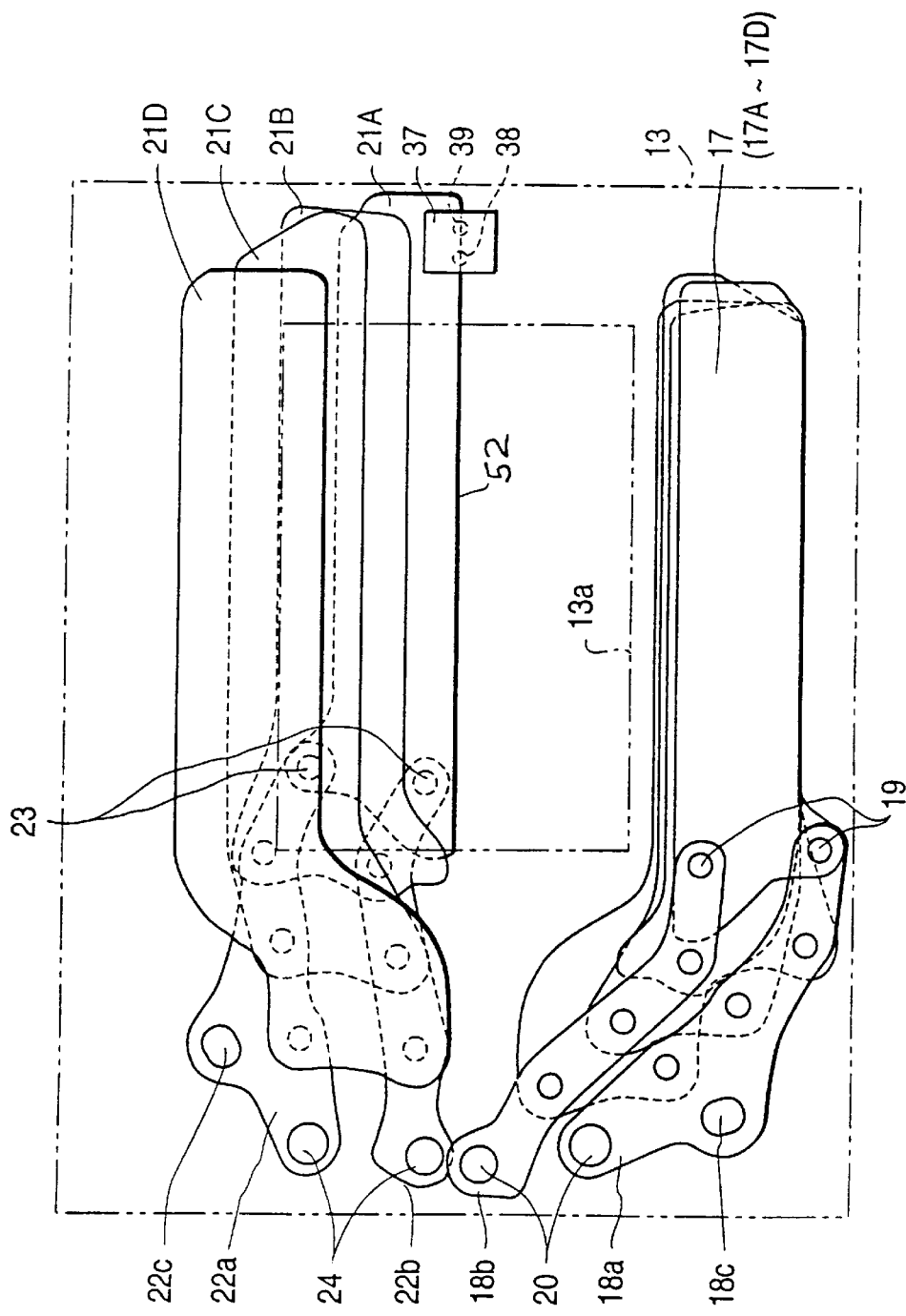
FIG. 12 is a plan view of a shutter instrumentation device of a camera according to an embodiment of the present invention.

FIGS. 9–13 will be described with further reference to FIGS. 15(a), 15(b) and 15(c), which are cross-sectional diagrams of the shutter of FIG. 7 taken along line XV—XV in FIG. 7. FIGS. 9 and 13 correspond to the state of FIG. 15(a). FIG. 12 corresponds to FIG. 15(b). FIG. 11 corresponds to FIG. 15(c).

FIG. 9 shows an initial shutter state, with front blind 17 covering aperture 13a and rear blind 21 folded up upwards of aperture 13a.

Figure 15A:
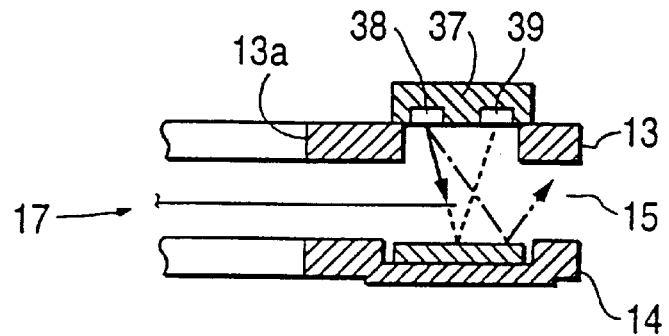
FIGS. 15(*a*), 15(*b*) and 15(*c*) are cross-sectional views of a shutter instrumentation device of a camera according to an embodiment of the present invention.

In FIG. 15(a), corresponding to FIG. 9, light shown by a solid line is emitted from LED 38 and obstructed by front blind 17. Due to this obstruction, the output of light receiving element 39 is at a low level due to the low reflectivity of front blind 17.

Additional rays of light, shown by a single-dot chain line, reach a portion of reflective surface 42a unobstructed by front blind 17. These additional rays are not incident on light receiving element 39 since reflective surface 42a is a specular reflective surface.

From the shutter state illustrated in FIG. 9, the travel of front blind 17 commences when the front blind magnet (not illustrated) of shutter mechanism 16 is activated, the opening of aperture 13a begins, and exposure of the film commences. The process to move to the state shown in FIG. 10 will be described using FIGS. 14(a)–14(c).

Figure 14A:
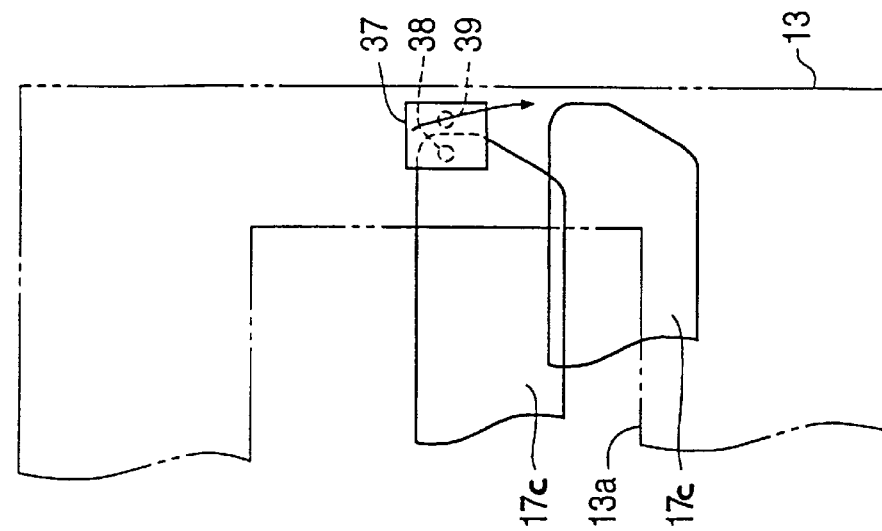
FIGS. 14(*a*), 14(*b*) and 14(*c*) are plan views illustrating the shutter action of a camera according to an embodiment of the present invention.
Figure 14B:
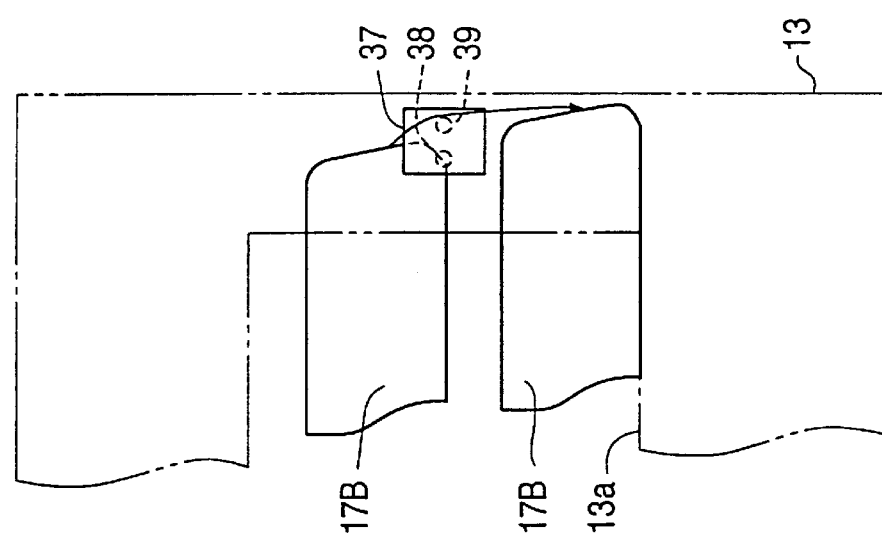
Figure 14C:
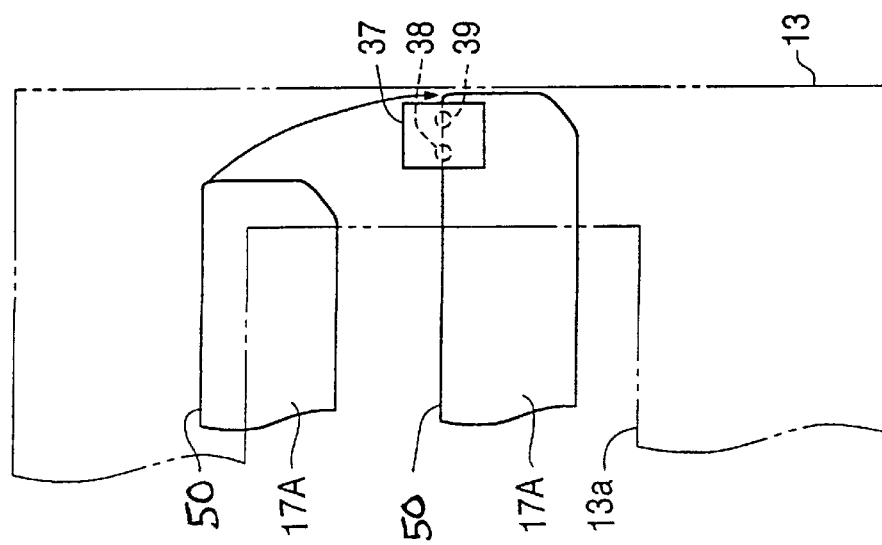

FIG. 14(a) is a plan view showing the locus of slit forming shutter vane 17A. FIG. 14(b) and FIG. 14(c) are plan views showing the loci of the respective shutter vanes 17B and 17C. Shutter vanes 17B and 17C perform a circular arcuate motion while maintaining a horizontal attitude.

As shown in FIG. 14(c), shutter vane 17C initially covers LED 38. While traveling and slightly covering light receiving element 39, shutter vane 17C moves away from detection device 37, as shown in FIG. 14(c).

As shown in FIG. 14(b), shutter vane 17B initially covers LED 38. During its travel, shutter vane 17B moves to cover LED 38 and light receiving element 39, then moves away from detection device 37, as has been shown in FIG. 14(b).

As shown in FIG. 14(a), slit forming shutter vane 17A is initially in a position moved away from the detection device 37. During its travel, shutter vane 17A moves to cover LED 38 and light receiving element 39, its slit edge 50 passing across LED 38 and light receiving element 39.

Shutter vanes 17A–17D mutually overlap and shutter vanes 21A–21D mutually overlap. Shutter vanes 17A–17D and 21A–21D are designed so that, accompanying their travel, the amount of overlap gradually increases. In this manner, slit forming shutter vane 17A begins to cover detection device 37 before shutter vane 17C moves away from detection device 37.

Accordingly, front blind 17 proceeds from the shutter state illustrated in FIG. 9 to the shutter state illustrated in FIG. 10. As can be seen from FIGS. 9 and 10, front blind 17 moves from a state in which only LED 38 is covered (FIG. 9) and gradually moves to a state in which light receiving element 39 is also covered (FIG. 10). Moreover, as can be seen from an embodiment of the present invention illustrated in FIG. 10 and FIGS. 14(a)–14(c), shutter vanes 17B and 17C are horizontally extended to cover both LED 38 and light receiving element 39. However, the size of shutter vanes can be minimized so that only one shutter vane has an extended horizontal length.

Figure 15B:
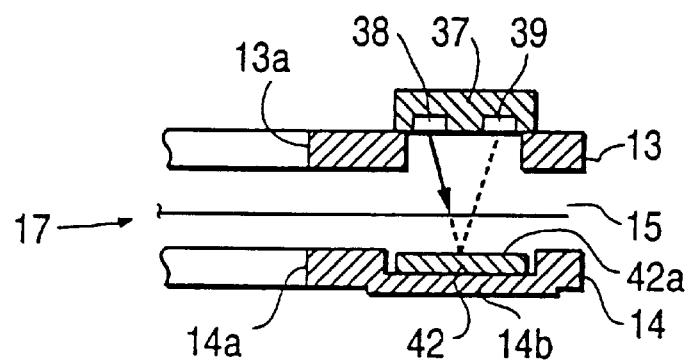

Referring now to FIGS. 15(a) and 15(b), the end surface of front blind 17 gradually moves towards the right (in FIGS. 15(a) and 15(b)), and light receiving element 39 becomes covered (see FIG. 15(b)). FIG. 15(b) represents the shutter state illustrated in FIG. 10. Accordingly, as illustrated in FIG. 10, no light emitted by LED 38 and reflected by the reflective surface 42a is incident on light receiving element 39. As a result, the output of light receiving element 39 remains at a low level.

Figure 15C:
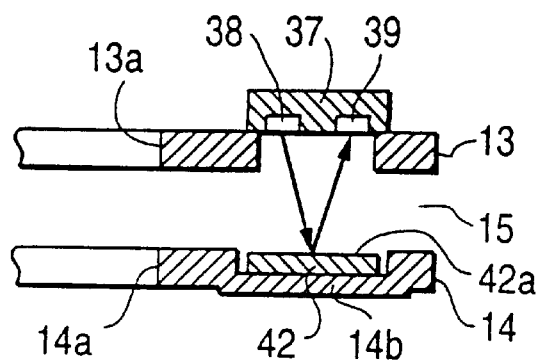

Then, slit edge 50 of shutter vane 17A moves away from LED 38 and light receiving unit 39 and the shutter state instantaneously becomes that shown in FIGS. 11 and 15(c). In FIG. 15(c), since light from LED 38 is reflected by reflective surface 42a of reflecting member 42 and becomes incident on light receiving element 39, the output of light receiving element 39 reverses to a high level. Front blind 17 continues to travel further, and moves to reach the shutter state of FIG. 11 in which the opening of aperture 13a is complete. Moreover, the output of light receiving element 39 maintains a high level while proceeding from the shutter state illustrated in FIG. 10 to the shutter state illustrated in FIG. 11.

Then, as shown in FIG. 12, slit edge 52 of slit forming shutter vane 21A of rear blind 21 reaches detection device 37. The shutter state illustrated in FIG. 12 corresponds to the shutter state illustrated in FIG. 15(b). In this shutter state, the output of light receiving element 39 reverses from a high level to a low level.

Rear blind 21 continues to travel further, and eventually reaches the state of FIG. 13 in which aperture 13a is covered by rear blind 21. In the shutter state illustrated in FIG. 13, the travel of rear blind 21, and the exposure, is complete While proceeding from the shutter state illustrated in FIG. 12 to the shutter state illustrated in FIG. 13, rear blind 21 traces a reverse process to the process followed by front blind 17 proceeding from the shutter state illustrated in FIG. 9 to the shutter state illustrated in FIG. 10. Namely, the relationship of rear blind 21 to LED 38 and light receiving element 39 moves from that shown in FIG. 15(b) to that shown in FIG. 15(a). Accordingly, the output of light receiving element 39 remains at a low level during this process and remains low until the shutter state changes.

After the end of the exposure, front blind 17 and rear blind 21 are charged via shutter mechanism unit 16 by a motor (not illustrated) and a shutter windup mechanism (not illustrated), and the shutter state returns to the shutter state illustrated in FIG. 9.

Figure 16A:
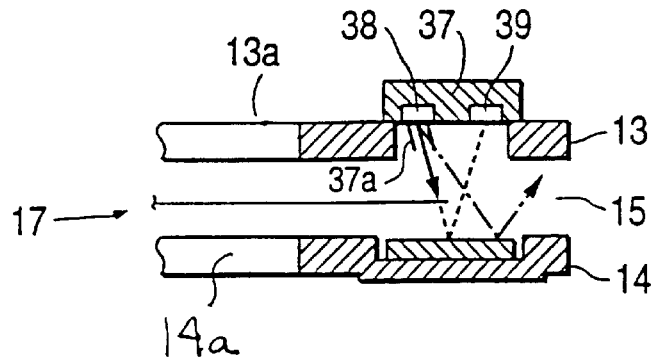
FIGS. 16(*a*), 16(*b*) and 16(*c*) are cross-sectional views of a shutter instrumentation device of a camera according to an embodiment of the present invention.
Figure 16B:
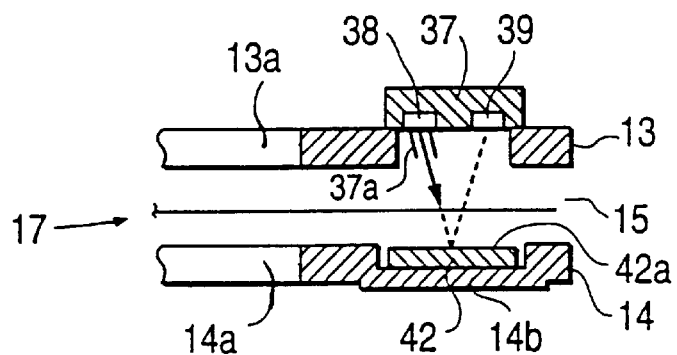
Figure 16C:
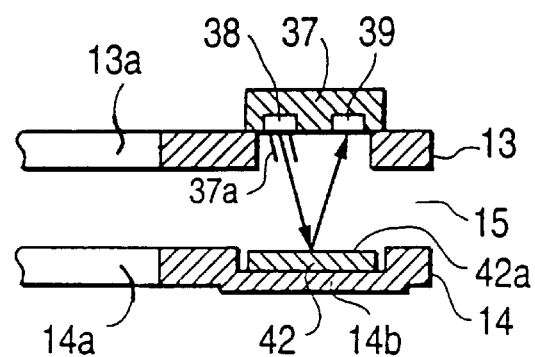

Moreover, as shown in FIGS. 16(a), 16(b) and 16(c), guide mechanism 37a guides the light path of light projected by LED 38 or received by light receiving element 39. A single guide mechanism 37a could be used, or, multiple guide mechanisms could be used, one for LED 38 and one for light receiving element 39. Additionally, a single guide mechanism could be used with light receiving element 39. In this manner, scattering of light emitted by LED 38 or received by light receiving element 39 can be prevented.

To begin exposure, front blind 17 initially covers aperture 13a and is held by the front blind magnet (not illustrated) of shutter mechanism 16. When front blind magnet is set OFF, front blind 17 begins to travel. After an exposure control time T (discussed later) has elapsed, the rear blind magnet (not illustrated) of shutter mechanism 16 is set OFF and rear blind begins to cover aperture 13a.

Figure 17:
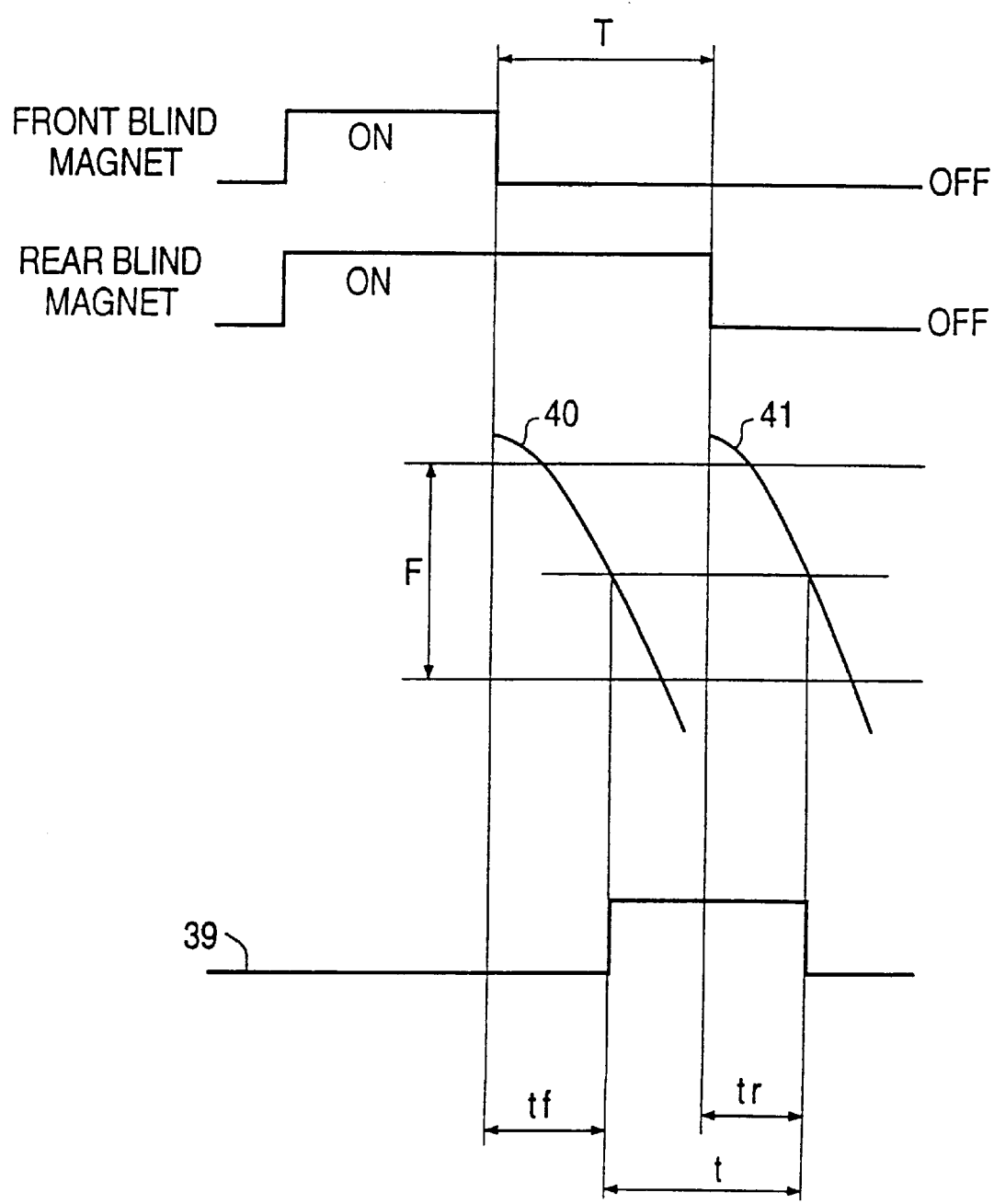
FIG. 17 is a timing chart illustrating the action of a camera having a shutter instrumentation device according to an embodiment of the present invention.

FIG. 17 is a timing chart illustrating the travel of front blind 17 and rear blind 21 in relation to the output of light receiving element 39. Slit edge 50 of slit forming shutter vane 17A of front blind 17 travels as shown by travel curve 40. Region F shows the vertical opening portion of aperture 6. After time tf has elapsed from setting of the front blind magnet OFF, the slit edge 50 of front blind 17 passes across detection device 37 and the output of light receiving element 39 reverses. The output of light receiving element 39 is now at a high level.

Time T represents a shutter control time, calculated by CPU 32 to be the exposure time. After shutter control time T has elapsed from the setting of the front blind magnet OFF, the rear blind magnet is set OFF. Setting the rear blind magnet OFF causes slit edge 52 of slit forming shutter vane 21A of the rear blind 21 to pass across region F, as shown by travel curve 41. Also, because the rear blind magnet is set OFF at this time, slit edge 21a passes across detection device 37 after time tr has elapsed. This causes the output of light receiving element 39 to reverse. Therefore, the output of light receiving element 39 is now at a low level.

If actual exposure time t is measured from the rise to the fall of the output of light receiving element 39 (that is, if the time between reversals of output of light receiving element 39 are measured), it is possible to know the true exposure time t. For example, assuming that the front blind magnet and the rear blind magnet are driven with correct timing for the exposure time T, there can still be a deviation between the shutter control time T and the true exposure time t. It can be determined that an erroneous action in the mechanical operation of the front blind 17 and rear blind 21 occurred if the actual exposure time t obtained from measuring the output of light receiving element 39 differs from shutter control time T.

Time tf represents the travel time (blind speed) of front blind 17 and is the time from setting the front blind magnet OFF up to the time when slit edge 50 passes across detection device 37. Time tr represents the travel time (blind speed) of the rear blind 21 and is the time from setting the rear blind magnet OFF up to the time when slit edge 52 passes across detection device 37. The travel times (blind speeds) of front blind 17 and rear blind 21 can be determined by measuring times tf and tr.

If either times tf and tr are longer than a standard value, the respective blind travel is too slow. If times tf and tr are faster than a standard time, the respective blind travel is too fast. In this manner, it is possible to determine irregularities of exposure.

CPU 32 can then adjust the shutter control time T to compensate for deviations in times tf and tr. For example, if tf is too long, shutter control time T can be reduced.

In addition, a warning can be displayed on LCD 34 to notify the photographer of a shutter failure.

Figure 18:
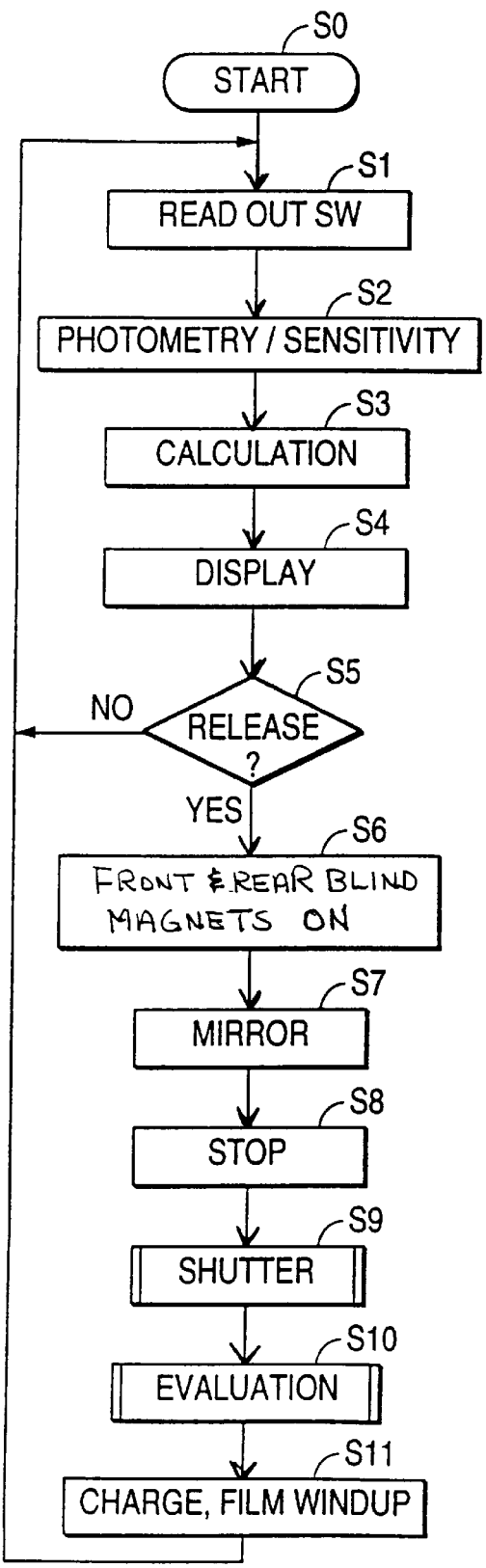
FIG. 18 is a flowchart illustrating an overall operating sequence of a camera having a shutter instrumentation device according to an embodiment of the present invention.

FIG. 18 is a flowchart which illustrates a processing sequence of CPU 32 for an embodiment of the camera according to the present invention. The processing sequence of FIG. 2 is repeated while battery 25 supplies power to the circuit.

The process starts from step S0. In step S1, the status of switches monitored by switch detection mechanism 28 is read. In step S2, photometric signals and sensitivity signals are input from photometric mechanism 26 and film sensitivity detection mechanism 27. In step S3, the appropriate exposure conditions of shutter time and stop value are calculated by CPU 32 from the photometric signals and sensitivity signals obtained in step S2. In step S4, the exposure conditions found in step S3 are displayed on LCD 34.

In step S5, via the switch detection mechanism 28, it is determined whether or not release button 10 has been pressed. If release button 10 has not been pressed, the process returns to step S1 and repeats. If release button 10 has been pressed in step S5, the process moves to step S6.

In step S6, the front blind magnet and rear blind magnet are set ON. In step S7, a reflecting mirror (not illustrated) is raised and moved out of the photographic light path. In step S8, stop 35 is controlled to become a predetermined stop aperture. In step S9, shutter processing is performed to control exposure of the film by opening and closing shutter 8.

Figure 21:
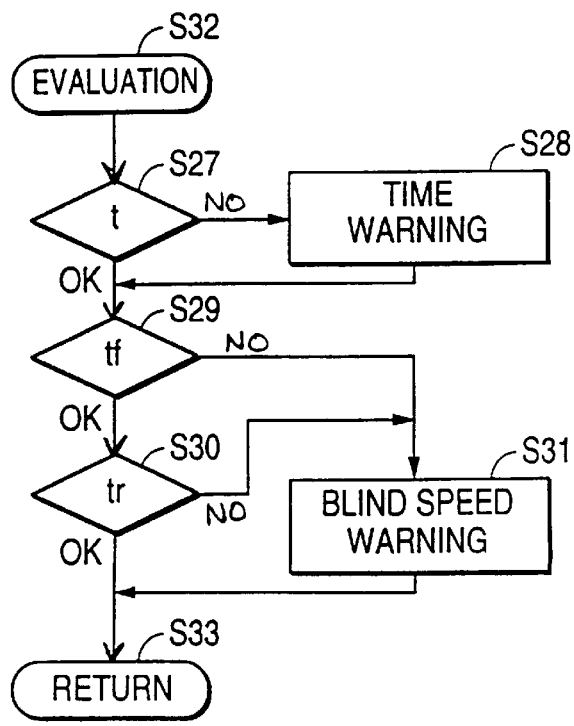
FIG. 21 is a flowchart to illustrate the operation relating to evaluation analysis of a camera having a shutter instrumentation device according to an embodiment of the present invention.

In step S10, an evaluation is performed of the timing data detected by detection device 37. Details of the evaluation are illustrated in FIG. 21.

In step S11, the operation of exposure is complete, therefore, motor 36 is rotated normally to charge the shutter vane springs (not illustrated) and wind the film. The process then returns to step S1.

Figure 19:
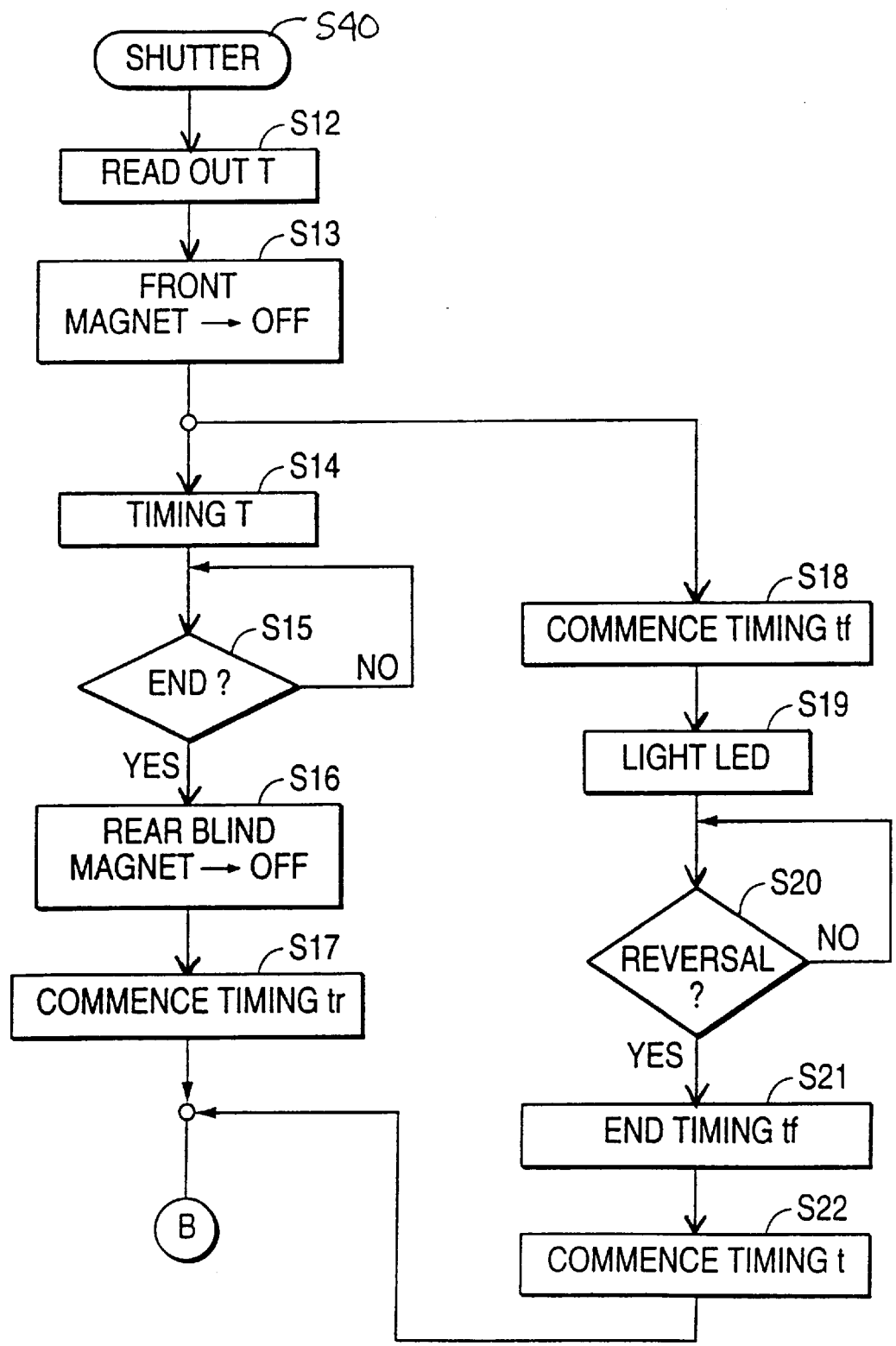
FIG. 19 is a flowchart illustrating the shutter control for a camera having a shutter instrumentation device according to an embodiment of the present invention.
Figure 20:
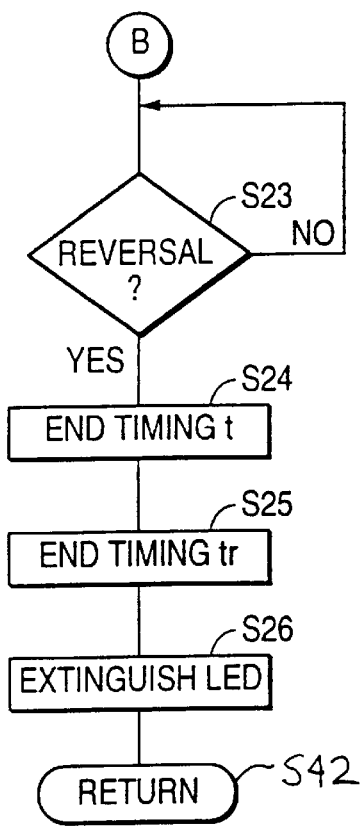
FIG. 20 is a flowchart illustrating the shutter control for a camera having a shutter instrumentation device according to an embodiment of the present invention.

FIGS. 19 and 20 are flow charts showing details of shutter processing of step S9 in FIG. 18.

The process starts from step S40. In step S12, the shutter control time T set by setting button 11 (FIG. 1) or determined by CPU 32 is read out. In step S13, the current passing to the front blind magnet is ended and the travel of front blind 17 is commenced. After this, processes beginning from step S14 and step S18, respectively, are simultaneously performed. Moreover, for clarity of the description in this embodiment of the present invention, the shutter control time T is sufficiently longer than the travel times tf and tr of front blind 17 and rear blind 21, respectively.

In step S14, measuring of shutter control time T is commenced. In step S15, the ending of shutter control time T is awaited. In step S16, shutter control time T has elapsed, therefore, current passing to the rear blind magnet is ended and the travel of rear blind 21 is commenced. In step S17, measurement of time tr is commenced.

In step S18, measuring of time tf is commenced, simultaneously with step S14. In step S19, LED 38 is lit. In step S20, a reversal of the output of light receiving element 39 caused by slit edge 50 of front blind 17 passing across detection device 37 is awaited. In step S21, measurement of time tf is ended. In step S22, the measurement of actual exposure time t is commenced.

In step S23, a reversal of the output of light receiving element 39 due to the ending of the passage of slit edge 21a of rear blind 21 across detection device 37 is awaited. In step S24, the measurement of actual exposure time t is completed. In step S25, the measurement of time tr is completed. In step S26, since measurement of tf and tr are complete, LED 38 is extinguished and the process returns from step S42 in FIG. 20 to step S10 of FIG. 18.

FIG. 21 is a flowchart illustrating the evaluation analysis of step S10 shown in FIG. 18.

The process begins from step S32. In step S27, it is determined whether actual exposure time t is within a previously fixed tolerance time width with respect to the shutter control time T. In the case of a deviation from the tolerance time width, a time warning is performed in step S28. This warning is an announcement to the effect that the exposure time does not satisfy the predetermined value. For example, this warning can be a sound warning or an indicator lit on LCD 34.

In step S27, if actual exposure time t is determined to be within the tolerance time width, the system proceeds to step S29. In step S29, it is determined whether the travel time tf of front blind 17 is within a predetermined tolerance width. In the case of a deviation from the tolerance width, a blind speed warning is given in step S31 to indicate that there is a deviation from the tolerance width. The routine then returns from step S33 in FIG. 21 to step S11 of FIG. 18. If tf is determined in step S29 to be within the tolerance width, the system proceeds to step S30 where it is determined whether the travel time tr of rear blind 21 is within a predetermined time width.

In step S30, when it is determined that the travel time tr of rear blind 21 deviates from the tolerance width, a blind speed warning is given in step S31 to indicate that there is a deviation from the tolerance width. The system then returns from step S33 in FIG. 21 to step S11 of FIG. 18. When it is determined in step S30 that the travel time tr of rear blind 21 is within the predetermined time width, the routine proceeds directly to step S11 of FIG. 18.

The blind speed warning of step S31 can be a sound warning or an indicator lit on LCD 34.

In embodiments of the camera of the present invention described above, when either front blind 17 or rear blind 21 pass over aperture 13a, either LED 38 or light receiving element 39 of detection mechanism 37 are covered by a shutter vane. In summary, only a portion (either LED 38 or light receiving element 39) of detection device 37 needs to be covered by a shutter vane. Therefore, the horizontal length of shutter vanes can be minimized. In an additional embodiment of a camera according to the present invention, reflecting member 42 is covered by a shutter vane of front blind 17 or rear blind 21. Reflecting member 42 can be covered alone, or in conjunction with either LED 38 or light receiving element 39.

Additional elongation of the second and third shutter vanes 17B–17C and 21B–21C would exert too much effect on the inertia of the entire shutter system. Therefore, embodiments of a camera according to the present invention allow for a minimization of the energy necessary to drive shutter 8. In addition, the size of shutter 8 can be minimized.

In the embodiments of a camera according to the present invention described herein, shutter vanes which extend in a longer lengthwise direction than other shutter vanes in the same shutter blind can be referred to as "special" vanes.

The present invention recognizes that shutter vanes of a parallel ring-type of shutter vane mechanism make a circular arcuate motion. Because the covering of detection device 37 by shutter vanes is more efficiently realized using this circular arcuate form of vane locus, various modifications are possible. The present invention is not intended to be limited to the embodiments presented herein.

For example, plural detection devices 37 can be used. Furthermore, the position of a detection device 37 can be varied for the position described herein. Shutter blinds can also be comprised by more or less than four shutter vanes. Moreover, in the present embodiments of the camera of the present invention, LED 38 and light receiving element 39 of detection device 37 have been located on baseplate 13. However, LED 38 and light receiving element 39 can be placed on cover plate 14. An object of the present invention can be achieved if the positional relationship of LED 38 and light receiving element 39 is reversed.

In the present embodiments of the camera of the present invention, plural shutter vanes close an aperture. Because one portion of plural shutter vanes covers a light projecting mechanism, a light receiving mechanism, or a reflecting mechanism, it is possible to provide a camera having a shutter mechanism such that there are two reversals of the output waveform from the light receiving mechanism during one exposure action. Furthermore, shutter size can be reduced.

An embodiment of the present invention could also have two independent apertures. The first aperture is designed so that light passes from a photographic subject through lens 2 to expose the film. This first aperture corresponds to the combination of apertures 6, 13a and 14a, which combine to allow light to pass from an photographic subject to the film. A second aperture, independent of the first aperture, is designed to allow signals projected from LED 38 to interact with front blind 17, rear blind 21 and/or a reflecting member 42 and be received by light receiving element 39. In effect, a shutter instrumentation device is designed to operate independently of the aperture which allows slight to pass from a photograph subject to the film.

In order to achieve objects of the present invention, a camera is equipped with plural shutter vanes which open and close an aperture. A light projection mechanism is positioned opposite the travel plane of the shutter vanes and faces the travel plane of the shutter vanes. A reflection mechanism reflects the projected light and is positioned facing the travel plane and on the opposite side of the shutter vanes from the light projection mechanism. A light receiving mechanism receives light reflected from the travel surface side and is positioned in line with the projection mechanism in a direction different from the optical axis direction and in a direction approximately perpendicular to the travel direction of the shutter vanes. When the plural shutter vanes close the aperture, a portion of the plural shutter vanes covers either the light projection mechanism, the light receiving mechanism or the reflecting mechanism.

In the above embodiments of the camera according to the present invention, only a portion of the plural shutter vanes covers either the light projecting mechanism, the light receiving mechanism or the reflecting mechanism. When in such a state, no light (or minimal light) reaches the light emitting mechanism from the light receiving mechanism. In this state, the output of the light emitting mechanism is at a low level.

Although a few preferred embodiments of the present invention have been shown and described, it would be appreciated by those skilled in the art that changes may be made in these embodiments without departing from the principles and spirit of the invention, the scop of which is defined in the claims and their equivalents.

What is claimed is:

1. A camera, comprising:
    a shutter which travels in a travel plane to open and close an aperture;
    a signal projection unit, positioned to one side of the travel plane, for projecting signals towards the travel plane of said shutter so that the signals reflect off said shutter and are thereby blocked from passing through the travel plane when the aperture is closed by said shutter and so that the signals pass through the travel plane when the aperture is opened by said shutter;
    a reflecting member, positioned on the opposite side of the travel plane as the signal projection unit is positioned, for reflecting signals projected by said signal projection unit which pass through the travel plane; and
    a signal receiving unit, positioned on the same side of the travel plane as the signal projection unit is positioned, for receiving signals projected by said signal projection unit which are reflected off said shutter and for receiving signals projected by said signal projection unit which are reflected off said reflecting member, wherein, when said shutter closes the aperture, said shutter covers at least a portion of at least one of said signal projection unit, said signal receiving unit and said reflecting member, to obstruct either the projected signals or the received signals, and
    said signal projection unit, said reflecting member and said signal receiving unit are fixed to the camera for use during the taking of a photograph.

2. A camera as in claim 1, wherein said reflecting member has a specular reflective surface.

3. A camera as in claim 1, wherein:
    said signal projection unit comprises a guide member to guide signals projected by said signal projection unit.

4. A camera as in claim 1, wherein said shutter comprises:
    a front blind having at least two vanes, at least one, but not all, of said at least two vanes being a longer vane having a front end portion and a length longer than the other vanes of said at least two vanes of said front blind; and
    a rear blind having at least two vanes, at least one, but not all, of said at least two vanes being a longer vane having a front end portion and a length longer than the other vanes of said at least two vanes of said rear blind;
    wherein, when said shutter closes said aperture, the front end portions of said longer vanes cover at least one of said signal projection unit, said signal receiving unit, and said reflecting member.

5. A camera as in claim 1, wherein said signal receiving unit outputs a signal in relation to the signals received and a control unit determines the actual exposure time of said shutter by analyzing the output of said signal receiving unit.

6. A camera as in claim 5, wherein the output of said signal receiving unit experiences four reversals for each exposure.

7. A camera as in claim 5, wherein the output of said signal receiving unit experiences only two reversals for each exposure.

8. A camera as in claim 1, wherein:
said aperture is a first aperture and said camera comprises a second aperture which is independent of the first aperture;
said shutter travels in the travel plane to open and close the first aperture and, when said shutter travels to open and close the first aperture, said shutter travels across the second aperture and covers at least a portion of the second aperture;
said signal projection unit projects signals towards the second aperture so that the signals reflects off said shutter when the shutter travels across the second aperture and so that the signals passes through the second aperture and reflects off said reflecting member when said shutter is not travelling across the second aperture; and
said signal receiving unit is positioned for receiving signals projected by said signal projection unit which reflect off said shutter or said reflecting member and pass through the second aperture to said signal receiving unit.

9. A camera, comprising:
a shutter which travels in a travel plane to open and close an aperture;
a signal projection unit, positioned to one side of the travel plane, for projecting signals towards the travel plane of said shutter so that the signals reflect off said shutter and are thereby blocked from passing through the travel plane when the aperture is closed by said shutter and so that the signals pass through the travel plane when the aperture is opened by said shutter;
a reflecting member, positioned on the opposite side of the travel plane as the signal projection unit is positioned, for reflecting signals projected by said signal projection unit which pass through the travel plane; and
a signal receiving unit for receiving either signals projected by said signal projection unit which are reflected off said shutter or signals projected by said signal projection unit which are reflected off said reflecting member, wherein,
when said shutter closes the aperture, said shutter covers at least a portion of at least one of said signal projection unit, said signal receiving unit or said reflecting member, to obstruct either the projected signals or the received signals, and
said signal projection unit, said reflecting member and said signal receiving unit are fixed to the camera for use during the taking of a photograph.

10. A camera as in claim 9, wherein said reflecting member has a specular reflective surface.

11. A camera as in claim 9, wherein:
said signal projection unit comprises a guide member to guide signals projected by said signal projection unit.

12. A camera as in claim 9, wherein said shutter comprises:

a front blind having at least two vanes, at least one, but not all, of said at least two vanes being a longer vane having a front end portion and a length longer than the other vanes of said at least two vanes of said front blind; and
a rear blind having at least two vanes, at least one, but not all, of said at least two vanes being a longer vane having a front end portion and a length longer than the other vanes of said at least two vanes of said rear blind;
wherein, when said shutter closes said aperture, the front end portions of said longer vanes cover either said signal projection unit, said signal receiving unit, or said reflecting member.

13. A camera as in claim 9, wherein said signal receiving unit outputs a signal in relation to the signals received and a control unit determines the actual exposure time of said shutter by analyzing the output of said signal receiving unit.

14. A camera as in claim 13, wherein the output of said signal receiving unit experiences four reversals for each exposure.

15. A camera as in claim 13, wherein the output of said signal receiving unit experiences only two reversals for each exposure.

16. A camera, comprising:
a shutter which travels in a travel plane to open and close a first aperture that allows light from a photographic subject to pass to film and, when said shutter travels to open and close the first aperture, said shutter travels across a second aperture and covers at least a portion of the second aperture, the second aperture being independent of the first aperture;
a signal projection unit, positioned to one side of the travel plane, for projecting signals through the second aperture towards the travel plane of said shutter so that the signals reflect off said shutter when said shutter travels across the second aperture; and
a signal receiving unit, positioned on the same side of the travel plane as the signal projection unit is positioned, for receiving signals projected by said signal projection unit which are reflected off said shutter and pass to said signal receiving unit through the second aperture.

17. A camera as in claim 16, wherein, when said shutter passes across the second aperture, said shutter covers either said signal projection unit or said signal receiving unit.

18. A camera as in claim 16, wherein said signal receiving unit outputs a signal in relation to the signals received and a control unit determines the actual exposure time of said shutter by analyzing the output of said signal receiving unit.

19. A camera as in claim 18, wherein the output of said signal receiving unit experiences only two reversals for each exposure.

20. A camera, comprising:
a shutter which travels in a travel plane to open and close an aperture, said shutter comprising
a front blind having at least two vanes, at least one, but not all, of said at least two vanes being a longer vane having a front end portion and a length longer than the other vanes of said at least two vanes of said front blind, and
a rear blind having at least two vanes, at least one, but not all, of said at least two vanes being a longer vane having a front end portion and a length longer than the other vanes of said at least two vanes of said rear blind;
a signal projection unit, positioned to one side of the travel plane, for projecting signals towards the travel plane of said shutter so that the signals reflect off said shutter and are thereby blocked from passing through the travel plane when the aperture is closed by said shutter and so that the signals pass through the travel plane when the aperture is opened by said shutter;

a reflecting member, positioned on the opposite side of the travel plane as the signal projection unit is positioned, for reflecting signals projected by said signal projection unit which pass through the travel plane; and a signal receiving unit, positioned on the same side of the travel plane as the signal projection unit is positioned, for receiving signals projected by said signal projection unit which are reflected off said shutter and for receiving signals projected by said signal projection unit which are reflected off said reflecting member, wherein, when said shutter closes the aperture, the front end portions of said longer vanes cover at least a portion of at least one of said signal projection unit, said signal receiving unit and said reflecting member, to obstruct either the projected signals or the received signals.

21. A camera for exposing a recording medium to light from a subject and having a first aperture and a second aperture which is independent of the first aperture, comprising:

a shutter which travels in a travel plane to open and close the first aperture to expose the recording medium to light from the subject and, when the shutter travels to open and close the first aperture, the shutter travels across the second aperture and covers at least a portion of the second aperture;

a signal projection unit, positioned to one side of the travel plane, for projecting signals towards the travel plane of the shutter, the second aperture being positioned in the path of the signals projected by the signal projection unit, the signals projected by the signal projecting unit being obstructed by the shutter and reflecting off the shutter when the shutter travels across the second aperture, and being unobstructed by the shutter and passing through the second aperture when the shutter is not travelling across the second aperture;

a reflecting member, positioned on the opposite side of the travel plane as the signal projection unit is positioned, for reflecting signals projected by the signal projection unit and passing through the second aperture unobstructed by the shutter; and a signal receiving unit, positioned on the same side of the travel plane as the signal projection unit is positioned, for receiving signals projected by the signal projection unit and reflected off the shutter and for receiving signals projected by the signal projection unit and reflected off the reflecting member, unobstructed by the shutter, and passing back through the second aperture to the signal receiving unit.

22. A camera, comprising:

a shutter which travels in a travel plane to open and close an aperture, the shutter comprising a front blind having at least two vanes, at least one, but not all, of the at least two vanes being a longer vane having a front end portion and a length longer than the other vanes of the at least two vanes of the front blind, and a rear blind having at least two vanes, at least one, but not all, of the at least two vanes being a longer vane having a front end portion and a length longer than the other vanes of the at least two vanes of the rear blind;

a signal projection unit, positioned to one side of the travel plane, for projecting signals towards the travel plane of the shutter;

a reflecting member, positioned on the opposite side of the travel plane as the signal projection unit is positioned, for reflecting signals projected by the signal projection unit and passing through the travel plane, the longer vanes of the shutter operating to obstruct, by reflecting, signals projected by the signal projecting unit when the aperture is closed by the shutter to prevent the signals from passing through the travel plane, and operating to allow signals projected by the signal projecting unit to pass through the travel plane unobstructed when the aperture is opened by the shutter; and a signal receiving unit for receiving at least one of
  signals projected by the signal projection unit and reflected off the longer vanes of the shutter, and
  signals projected by the signal projection unit and reflected off the reflecting member unobstructed by the longer vanes of the shutter.

23. A camera, comprising:

a shutter which travels in a travel plane to open and close an aperture;

a signal projection unit, fixed to the camera and positioned to one side of the travel plane, which projects a signal towards the travel plane of said shutter so that the signal reflects off said shutter and is thereby blocked from passing through the travel plane when the aperture is closed by said shutter and so that the signal passes through the travel plane when the aperture is opened by said shutter;

a reflecting member, fixed to the camera and positioned on the opposite side of the travel plane as the signal projection unit is positioned, which reflects signals projected by said signal projection unit which pass through the travel plane; and a signal receiving unit, fixed to the camera and positioned on the same side of the travel plane as the signal projection unit is positioned, which receives signals projected by said signal projection unit that are reflected off said shutter and which receives signals projected by said signal projection unit that are reflected off said reflecting member;

wherein, when said shutter closes the aperture, said shutter covers at least a portion of at least one of said signal projection unit, said signal receiving unit and said reflecting member.

24. A camera, comprising:

a shutter which travels in a travel plane to open and close an aperture;

a signal projection unit, fixed to the camera and positioned to one side of the travel plane, which projects a signal towards the travel plane of said shutter so that the signal reflects off said shutter and is thereby blocked from passing through the travel plane when the aperture is closed by said shutter and so that the signal passes through the travel plane when the aperture is opened by said shutter;

a reflecting member, fixed to the camera and positioned on the opposite side of the travel plane as the signal projection unit is positioned, which reflects signals projected by said signal projection unit that pass through the travel plane; and a signal receiving unit, fixed to the camera, which receives either signals projected by said signal projection unit that are reflected off said shutter or signals projected by said signal projection unit that are reflected off said reflecting member;

wherein, when said shutter closes the aperture, said shutter covers at least a portion of at least one of said signal projection unit, said signal receiving unit or said reflecting member.

25. A camera as in claim 24, wherein said shutter covers at least one of said signal projection unit and said signal receiving unit when said shutter closes the aperture.

26. A camera as in claim 24, wherein said shutter covers a portion of said reflecting member when said shutter closes the aperture.

27. A camera, comprising:

a shutter which travels in a travel plane to open and close an aperture;

a signal projection unit, fixed to the camera and positioned to one side of the travel plane, which projects a signal towards the travel plane of said shutter so that the signal reflects off said shutter and is thereby blocked from passing through the travel plane when the aperture is closed by said shutter and so that the signal passes through the travel plane when the aperture is opened by said shutter;

a reflecting member, fixed to the camera and positioned on the opposite side of the travel plane as the signal projection unit is positioned, which reflects signals projected by said signal projection unit that pass through the travel plane; and a signal receiving unit, fixed to the camera, which receives either signals projected by said signal projection unit that are reflected off said shutter or signals projected by said signal projection unit that are reflected off said reflecting member;

wherein, when said shutter closes the aperture, said shutter covers one of a light path from said signal projection unit to said signal receiving unit or a light path from said reflecting member to said receiving unit.

* * * * *

UNITED STATES PATENT AND TRADEMARK OFFICE
CERTIFICATE OF CORRECTION

PATENT NO.: 6,072,958
DATED : June 6, 2000
INVENTOR(S): Masanori Hasuda

It is certified that error appears in the above-identified patent and that said Letters Patent is hereby corrected as shown below:

Title Page, [30] Foreign Application Priority Data,
insert, --March 2, 1993   [JP]   Japan   5-066025--.

Signed and Sealed this

Eighth Day of May, 2001

Attest:

NICHOLAS P. GODICI

Attesting Officer

Acting Director of the United States Patent and Trademark Office